(12) United States Patent
Badawy et al.

(10) Patent No.: US 10,443,535 B2
(45) Date of Patent: Oct. 15, 2019

(54) ION CURRENT USE FOR COMBUSTION RESONANCE DETECTION, REDUCTION AND ENGINE CONTROL

(71) Applicant: Wayne State University, Detroit, MI (US)

(72) Inventors: Tamer H. Badawy, Rochester Hills, MI (US); Naeim A. Henein, Grosse Pointe Shores, MI (US)

(73) Assignee: Wayne State University, Detroit, MI (US)

( * ) Notice: Subject to any disclaimer, the term of this patent is extended or adjusted under 35 U.S.C. 154(b) by 265 days.

(21) Appl. No.: 14/431,759

(22) PCT Filed: Sep. 27, 2013

(86) PCT No.: PCT/US2013/062146
§ 371 (c)(1),
(2) Date: Mar. 26, 2015

(87) PCT Pub. No.: WO2014/052738
PCT Pub. Date: Apr. 3, 2014

(65) Prior Publication Data
US 2015/0211435 A1 Jul. 30, 2015

Related U.S. Application Data

(60) Provisional application No. 61/707,361, filed on Sep. 28, 2012.

(51) Int. Cl.
*F02D 41/40* (2006.01)
*F02D 35/02* (2006.01)
(Continued)

(52) U.S. Cl.
CPC ......... *F02D 41/403* (2013.01); *F02D 35/021* (2013.01); *G01M 15/12* (2013.01);
(Continued)

(58) Field of Classification Search
CPC .. F02D 41/403; F02D 35/021; F02D 41/0007; F02D 41/0002; F02D 2041/389;
(Continued)

(56) References Cited

U.S. PATENT DOCUMENTS 3,841,283 A * 10/1974 Wood .................. F02D 41/1446
123/676
3,874,171 A * 4/1975 Schmidt .................... F01N 3/18
123/672

(Continued)

FOREIGN PATENT DOCUMENTS

| DE | 103 24 577 A1 | 12/2004 |
| WO | WO 97/24527 A1 | 7/1997 |
| WO | WO 2012/118781 A2 | 9/2012 |

OTHER PUBLICATIONS

Badawy et al., Detection of Combustion Resonance Using an Ion Current Sensor in Diesel Engines. Journal of Engineering for Gas Turbines and Power. vol. 134, May 2012. Retrieved on Feb. 12, 2014. Retrieved from the Internet.
(Continued)

*Primary Examiner* — Joseph Dallo
(74) *Attorney, Agent, or Firm* — Brinks Gilson & Lione

(57) ABSTRACT

A system and method for detection, reduction of combustion resonance and engine control is provided. The system senses ion current within one or each cylinder of a multi-cylinder engine and determines combustion resonance from the ion current signal. In addition, the system may determine an engine control strategy to reduce combustion resonance based on the feedback from the ion current signal.

20 Claims, 17 Drawing Sheets

(51) Int. Cl.
*G01M 15/12* (2006.01)
*F02D 41/38* (2006.01)
*F02D 41/28* (2006.01)
*F02D 41/00* (2006.01)

(52) U.S. Cl.
CPC ...... *F02D 41/0002* (2013.01); *F02D 41/0007* (2013.01); *F02D 41/0052* (2013.01); *F02D 41/3836* (2013.01); *F02D 41/401* (2013.01); *F02D 41/402* (2013.01); *F02D 2041/288* (2013.01); *F02D 2041/389* (2013.01); *F02D 2250/31* (2013.01); *Y02T 10/44* (2013.01)

(58) Field of Classification Search
CPC .. F02D 41/402; F02D 41/0052; F02D 41/401; F02D 41/3836; F02D 2250/31; F02D 2041/288; G01M 15/12; Y02T 10/44
See application file for complete search history.

(56) References Cited

U.S. PATENT DOCUMENTS

| | | | | |
|---|---|---|---|---|
| 3,903,853 | A * | 9/1975 | Kizler | F02D 41/1482 123/688 |
| 3,908,366 | A * | 9/1975 | Masaki | F01N 3/2053 340/579 |
| 4,372,270 | A * | 2/1983 | Latsch | G01N 27/68 123/703 |
| 4,426,987 | A * | 1/1984 | Latsch | G01N 27/68 123/698 |
| 4,705,009 | A * | 11/1987 | Asayama | F02D 41/0065 123/568.26 |
| 5,673,804 | A * | 10/1997 | Weiss | H01L 21/6773 212/274 |
| 6,089,077 | A * | 7/2000 | Daniels | F02D 35/021 73/35.03 |
| 6,279,538 | B1 * | 8/2001 | Herweg | F02D 35/021 123/406.26 |
| 6,725,834 | B2 * | 4/2004 | Yorita | G01L 23/221 123/406.29 |
| 6,931,914 | B2 * | 8/2005 | Dohi | G01L 23/225 73/35.08 |
| 6,993,960 | B2 * | 2/2006 | Benson | F23N 1/022 73/112.01 |
| 7,089,922 | B2 * | 8/2006 | Lindner | F02D 41/146 123/673 |
| 7,096,722 | B2 * | 8/2006 | Benson | F23N 5/123 73/114.08 |
| 7,204,133 | B2 * | 4/2007 | Benson | F23N 1/022 73/112.01 |
| 2002/0144539 | A1 * | 10/2002 | Yorita | G01L 23/221 73/35.08 |
| 2004/0025570 | A1 * | 2/2004 | Dohi | G01L 23/225 73/35.08 |
| 2004/0118557 | A1 * | 6/2004 | Ancimer | F02B 1/12 166/227 |
| 2005/0161017 | A1 * | 7/2005 | Warlick | F02D 19/0631 123/275 |
| 2006/0162689 | A1 | 7/2006 | Winkelman et al. | |
| 2006/0174853 | A1 * | 8/2006 | Koopmans | F02D 41/0002 123/295 |
| 2006/0288979 | A1 * | 12/2006 | Ancimer | F02B 23/0675 123/304 |
| 2008/0040020 | A1 | 2/2008 | Henein | |
| 2008/0051975 | A1 | 2/2008 | Ker et al. | |

OTHER PUBLICATIONS

Jezdik et al., Car's Ignition System Diagnostics Using Continuous Wavelet Transform. XIX IMEKO World Congress Fundamental and Applied Metrology. Jun. 6-11, 2009. Retrieved on Feb. 12, 2014. Retrieved from the Internet.
International Search Report for International Application No. PCT/US2013/062146, dated Mar. 5, 2014.
Tamer Badawy et al, "Detection of Combustion Resonance Using an Ion Current Sensor in Diesel Engines", ASME Proceedings Instrumentation, Controls, and Hybrids — ASME 2011 Internal Combustion Engine Division Fall Technical Conference, ASME, New York, US, Vol. ICEF2011-60068, Oct. 2, 2011, pgs. 755-763, X008180078, ISBN: 978-0-7918-4442-7.
Supplementary European Search Report, European Application No. EP 13 84 1889.2, Dated May 12, 2016, 2 pgs.

* cited by examiner

STFTs analysis for the filtered signals

ION CURRENT USE FOR COMBUSTION RESONANCE DETECTION, REDUCTION AND ENGINE CONTROL

CROSS-REFERENCE TO RELATED APPLICATIONS

This application is a 371 nation stage application of PCT Application No. PCT/US2013/062146, filed Sep. 27, 2013, which application claims the benefit of U.S. Provisional Application No. 61/707,361, filed on Sep. 28, 2012, the contents of which is hereby incorporated by reference in its entirety.

BACKGROUND

The present application generally relates to a system for the use of ion current to detect, reduce and control combustion produced resonance in direct injection internal combustion engines.

SUMMARY

Resonance is a phenomenon that occurs due to the oscillations (ringing) of burned gases inside the combustion chamber of internal combustion engines that produces engine vibration and noise. These oscillations are produced from the high rates of pressure rise during combustion and result in the vibration of different engine parts. The system described may use ion current to detect, reduce and control combustion produced resonance in direct injection internal combustion engines. The current state of the art detects these oscillations using accelerometers mounted on the engine body or pressure transducers fitted in the combustion chamber.

Combustion resonance is produced from the auto-ignition of the end gases which causes the engine to knock in gasoline engines. Combustion resonance is produced from the auto-ignition of the premixed charge in diesel engines which results in high rates of pressure rise upon combustion. Combustion resonance may be analyzed using many techniques such as the Fast Fourier Transform (FFT), Short-Time Fourier Transform (STFT), and Discrete Wavelet Transform (DWT). FFT is used to analyze combustion resonance in frequency domain. STFT and DWT are used to analyze combustion resonance in time-scaled-frequency domain.

In addition, an ion current sensor may be used independently or together with a pressure transducer and/or an accelerometer to detect combustion resonance produced in direct injection internal combustion engines.

Further objects, features and advantages of this system will become readily apparent to persons skilled in the art after a review of the following description, with reference to the drawings and claims that are appended to and form a part of this specification.

DETAILED DESCRIPTION

Figure 1:
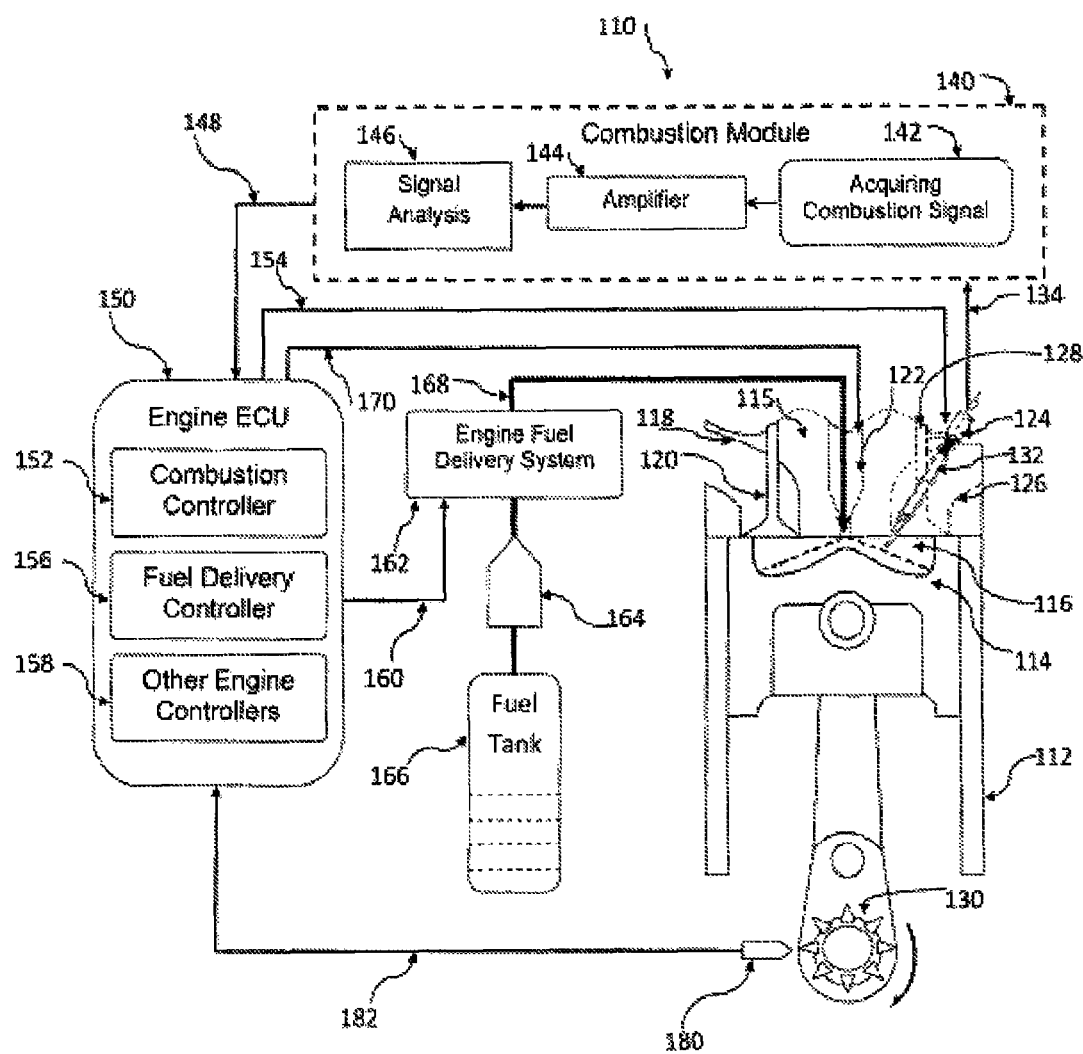
FIG. 1 is a schematic view of a direct injection internal combustion engine having an ECU that uses the ion current sensor to detect, reduce and control the combustion produced resonance.

As an example for the application of this system in direct injection internal combustion engines, the following discussions refer to the use of ion current signal for detection, reduction and control of combustion produced resonance in a direct injection diesel engine. Referring to FIG. 1, a schematic view of a diesel engine 110 is provided. For illustrative purposes the schematic shows a single cylinder of an engine, however, it is readily understood that multiple cylinders may be used in combination to form the engine. The cylinder 112 houses piston 114 allowing for reciprocating motion of the piston 114 within the cylinder 112. The combustion chamber 116 is formed by the cylinder houses 112, the piston 114, and the cylinder head 115. Air, a mixture of air and exhaust gases, or other mixtures of any fluid may be provided into the chamber 116 through an intake manifold 118. The flow of air or mixtures made through the intake manifold 118 may be controlled by intake valve 120. Fuel may be provided into the chamber by a fuel injector 122. A glow plug 124 may be used during cold starting to facilitate the ignition of the fuel inside the combustion chamber 116 causing reciprocating motion of the piston 114. After combustion, the exhaust gases in the chamber may be released through the exhaust manifold 126. Further, the flow of exhaust may be controlled by an exhaust valve 128 located within the exhaust manifold 126. As may be readily understood, combustion in the chamber 116 causes the piston 114 to move downward causing rotation of the crankshaft 130. The inertia of a flywheel or combustion in other chambers will cause the crankshaft 130 to rotate further thereby causing a reciprocating motion of the piston 114 upward. The glow plug 124 can be turned on by the ECU 150 through an electrical command 154. The glow plug 124 may also include a sensor 132 to monitor activity within the combustion chamber 116 during the entire cycle of the engine. The sensor 132 includes an ion current sensor, a pressure sensor, or other sensors. These sensors may be standalone or integrated with the glow plug 124 or the fuel injector 122. In case of spark ignition (SI) engines, the ion current sensor can be integrated with a spark plug. The sensor signal 134 may be provided to a combustion module 140. The combustion module 140 includes an acquisition module 142 for acquiring the combustion signal and amplifier 144 for enhancing the combustion signal and a signal analysis module 146 to determine certain combustion characteristics based on the enhanced combustion signal. The combustion parameters 148 are then provided to an engine control module 150. The engine control module 150 may then analyze the combustion parameters and control engine operation parameters based on the combustion parameters. In one implementation, the ion current signal may be used to control the engine operating parameters according to the priorities set during engine production to meet goals in controlling combustion produced resonance, engine power, fuel economy and emissions.

The engine control unit 150 includes a combustion controller 152, a fuel delivery controller 156 and other engine controllers 158. The combustion controller 152 may act as a master module that provides a control signal to different engine components such as the glow plug 124 heater, the fuel delivery system 162, the air delivery system or the injector 122. The fuel delivery controller 156 provides a fuel delivery control signal 160 to an engine fuel delivery system 162. The engine fuel delivery system controls the delivery of fuel to the injector 122. The fuel from the tank 166 is delivered by the fuel pump 164 to the fuel delivery system 162. The fuel delivery system 162 distributes the supplied fuel based on a signal 160 from the ECU 150. The fuel is further supplied to the injector 122 through a fuel line 168. In addition, the fuel delivery controller 156 is in communication electronically with the fuel injector 122 to control different injection parameters such as number of injection events, injection duration and timing as noted by line 170. In addition, the other engine controllers 158 control other engine parameters such as engine speed, load, amount of exhaust gas recirculation (EGR), variable valve timing, variable geometry turbocharger, or other units installed to the engine. Further, an output sensor 180 may be in communication with the crankshaft 130 to measure crankshaft position, and engine speed, torque of the crankshaft, or vibration of the crankshaft, and provide the feedback signal to the engine control unit 150 as denoted by line 182.

One experimental investigation has been carried out on a production John Deer 4.5 liter, 4-cylinder turbocharged diesel engine. The engine is equipped with a common rail injection system, variable geometry turbo charger, and an exhaust gas recirculation system. The engine has four valves per cylinder with centrally located injector, and a shallow type piston bowl. An open code electronic control unit (ECU) is used to control the engine. Engine specifications are shown in Table 1. Ultra low sulfur diesel fuel (ULSD) was used in this experiment. The load is applied to the engine using a water brake dynamometer. An optical encoder is installed on the crankshaft to acquire crank angle degrees (CAD) and engine speed.

TABLE 1

| Engine specifications and injection system configuration | |
|---|---|
| Model | 4045HF485 |
| Aspiration | Turbocharged |
| No. of Cylinder | 4 |
| Displacement (L) | 4.5 |
| Bore × Stroke (mm) | 106 × 127 |
| Compression Ratio | 17.0:1 |
| Con-Rod (mm) | 203 |
| Engine Type | 4 stroke |
| Max. Power (kW) | 147 |
| Injection System | Common Rail |

In this investigation, all tests were conducted at a constant speed of 1800 RPM. The combustion phasing was kept the same in all the experiments by keeping Location of the Peak rate of heat release due to Premixed Combustion (LPPC) at 4° after top dead center (aTDC). The combustion phasing is achieved by using the combustion controller 152 that uses the feedback of the ion current signal to keep LPPC at desired CAD location by adjusting accordingly the start of injection SOI.

The pressure waves produced from combustion resonate at a certain frequency dependent mainly on the speed of sound and the geometry of the combustion chamber. Assuming that the cylinder is filled with air at 2000 K, the speed of sound, $C_{cyl}$, is given by $$C_{cyl} = \sqrt{k.R.T} = \sqrt{1.28 \times 287 \times 2000K} \approx 857 \frac{m}{sec} \quad (1)$$

Where
k is specific heats ratio of air at 2000K
R is the air gas constant
T is the absolute gas temperature
Thus, the resonance frequency can be calculated by $$f_{Res} = \frac{C_{cyl} \cdot \alpha_{m,n}}{\pi \cdot B} = \frac{C_{cyl} \cdot \alpha_{1,0}}{\pi \cdot B} = \frac{857 \frac{m}{sec} \times 1.841}{\pi \cdot 0.106m} \approx 4.7 \text{ kHz} \quad (2)$$

Where $\alpha_{1,0}$ is the wave number for the $1^{st}$ mode of vibration

B is the cylinder bore in meters

TABLE 2

Vibration mode shapes for a cylindrical chamber and their corresponding resonance frequencies

| Mode Shape (m,n) | (1,0) 1 | (2,0) 2 | (0,1) 3 | (3,0) 4 | (1,1) 5 |
|---|---|---|---|---|---|
| $\alpha_{m,n}$ | 1.84 | 3.054 | 3.832 | 4.201 | 5.332 |
| $f_{Res}$ (kHz) | 4.6 | 7.9 | 9.9 | 11.0 | 13.8 |

The vibration mode shapes shown in Table 2 are calculated using the wave equation to obtain different oscillation mode shapes of pressure waves. The pressure waves may be assumed to be in an elastic medium enclosed in a circular cylinder. The wave equation may be solved for cylindrical coordinates using the Bessel function. The first five transverse modes are listed in Table 2, where radial, circumferential oscillations and their combinations are considered.

Figure 2:
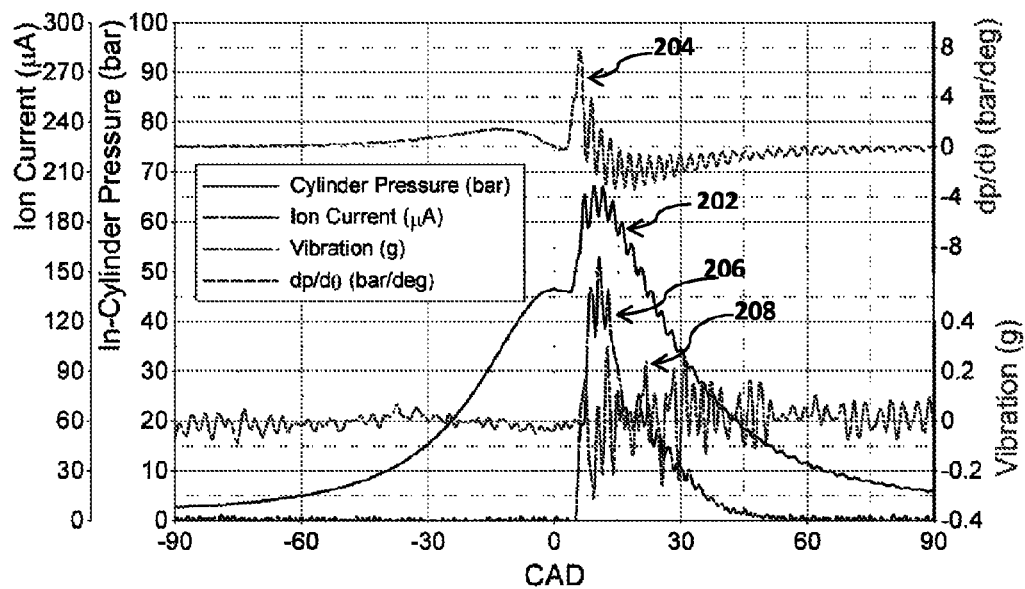
FIG. 2 is a graphical illustration of the cylinder gas pressure, ion current, and engine vibration traces versus crank angle degrees (CAD) for a single cycle illustrating combustion resonance.

FIG. 2 shows typical traces acquired in a test at an engine speed of 1800 rpm, IMEP of 6 bar, injection pressure of 800 bar and LPPC at 4° aTDC. The traces are illustrated for the cylinder gas pressure 202, pressure derivative (dp/dθ) 204, ion current 206 and accelerometer output (vibration signal) 208, during the compression and expansion strokes. Combustion resonance is initiated by a sharp increase in gas pressure rise with a maximum rate of 7.6 bar per CAD, and starts at 3.25° aTDC. This sharp increase in gas pressure produced a wave with amplitude of 8 bar, followed by waves with lower amplitudes, that eventually disappears after 45 crank angle degrees.

The ion current increased at a sharp rate, almost immediately after the start of the pressure rise due to combustion. This indicates the presence of high concentrations of ions and electrons as a result of a sharp rise in combustion temperature. The waves in the ion current indicate the presence of similar waves in the temperature and the concentration of the chemically ionized and thermally ionized species. The ion current waves produced from the premixed combustion fraction decayed at 13 degrees and are followed by another set of waves with lower amplitudes that diminishes after 45 CAD.

The engine vibration trace produced by the accelerometer starts at five crank angle degrees after the pressure waves. This is the time taken for the stresses produced by the gas pressure forces to reach the location of the accelerometer on the outer surface of the engine.

Figure 3:
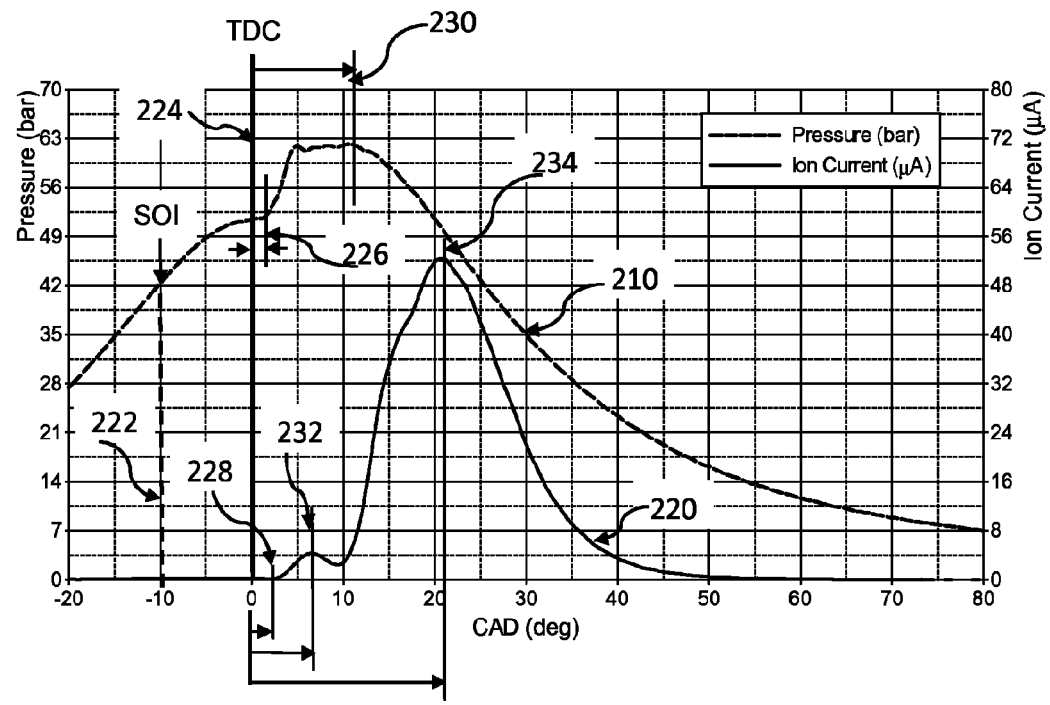
FIG. 3 is a graphical illustration of the cylinder gas pressure and ion current traces versus CAD averaged over many cycles.

Referring now to FIG. 3, the graph of the cylinder gas pressure and ion current are provided with respect to the crankshaft position. The cylinder gas pressure is denoted by line 210 and the ion current is denoted by line 220. The start of injection is denoted by line 222 occurs at crankshaft piston position −10°. The pressure signal 210 may have the units in bar, and the ion current signal 220 may have units in volt or micro ampere. At the start of injection the ion current was recorded at datum (zero) and the cylinder pressure is high in the compression stroke. The top dead center position is denoted by line 224. The following terms may be used as an input from the signal analysis 146 to the engine control unit 150. Line 226 denotes the start of combustion (SOC) in the signal 210 developed from the pressure inside the combustion chamber 114. Also, Line 228 denotes the start of combustion detected by the start of ion current (SIC) signal 220. Line 230 represents the location of the maximum cylinder gas pressure during combustion. Line 232 represents the location of the first peak in the ion current signal 220. Line 234 represents the location of the second peak in the ion current signal 220. Each of these characteristics of the cylinder pressure and ion current may be used to identify the characteristics of the combustion process as well as to adjust the engine parameters to achieve different production targets. For spark ignition engines, the cylinder gas pressure and ion current signals may look different than the signals in FIG. 3, but a person skilled in the art can identify their characteristics in a manner similar to what is described in this application.

Figure 4:
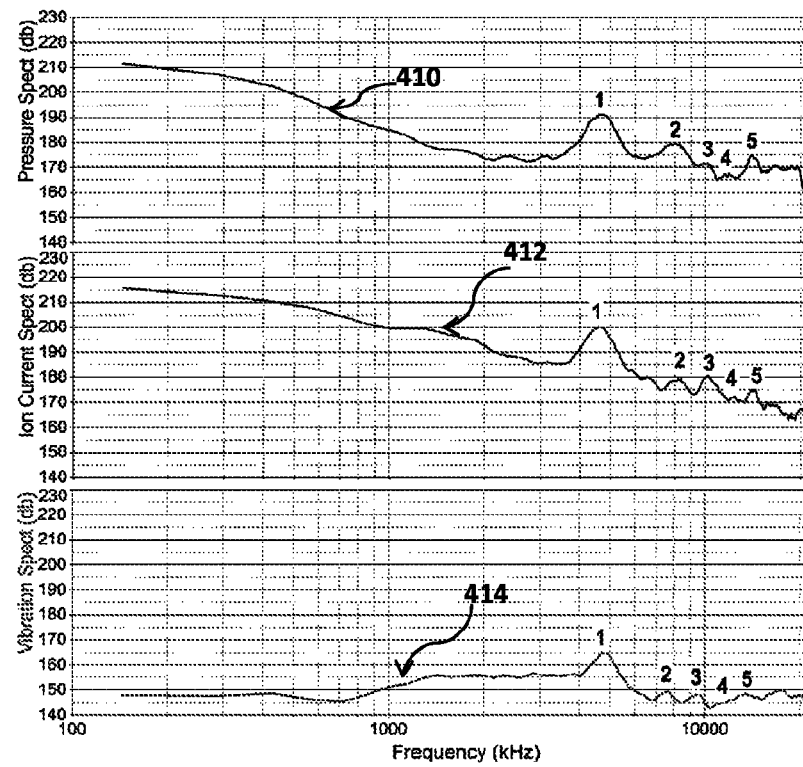
FIG. 4 is a graphical illustration of the frequency spectrum for pressure, ion current, and vibration during an engine cycle.

The method used to examine the combustion resonance is based on the analysis of the cylinder gas pressure signal 410 in the frequency domain as shown in FIG. 4. The pressure reference used is $P_0=20$ μPa. Similarly, the ion current signal 412 and the vibration signal 414 are plotted in FFT domain using the same reference value.

A fast Fourier transform was used for the frequency analysis of the signals, shown in FIG. 4, before applying any filters. The calculated resonance frequencies shown in Table 1 agree with the FFT spectrum of the signals for the cylinder pressure, ion current and engine vibration. It is also clear that the $1^{st}$ mode which appears at 4.6 kHz has the highest amplitude compared to other modes. This is followed by the $2^{nd}$ mode at 7.9 kHz. The resonance frequencies over 9 kHz are subjected to high noise to signal ratio and were not utilized in this scenario. In order to investigate the frequencies of interest, a band pass filter from 3 to 9 kHz was applied to the three signals.

Figure 5:
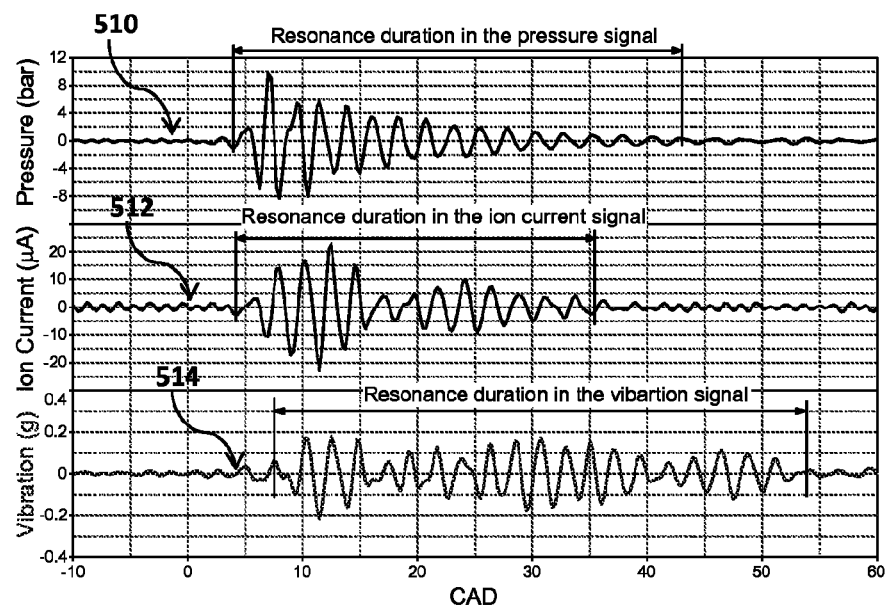
FIG. 5 is a graphical illustration of the resonance for the filtered pressure, ion current and vibration signals.

FIG. 5 shows the characteristics of the filtered signals in time domain. There is a phase shift in the start of each signal. The cylinder pressure is denoted by reference numeral 510. The ion is denoted by reference numeral 512 and the engine vibration is denoted by reference numeral 514. The delay of the ion current signal after the cylinder pressure signal is related to the position of the probe relative to the fuel sprays, in addition to the local gas temperature.

There is also a difference in the duration of the signals in FIG. 5. The longest is the engine vibration, caused by the behavior of the engine elastic components. This is followed by the cylinder gas pressure and the ion current signals. The oscillations in the pressure signal are the result of the pressure waves developed during the combustion process which are being damped later toward the end of combustion. In the case of the ion current signal, the probe detects the oscillations of ions that travel with the pressure waves that decay in the expansion stroke. However, the probe detects another set of oscillations at 15 degrees aTDC and remains for 20 CADs. These oscillations are caused by the ionization produced from the mixing and diffusion controlled combustion.

Figure 6:
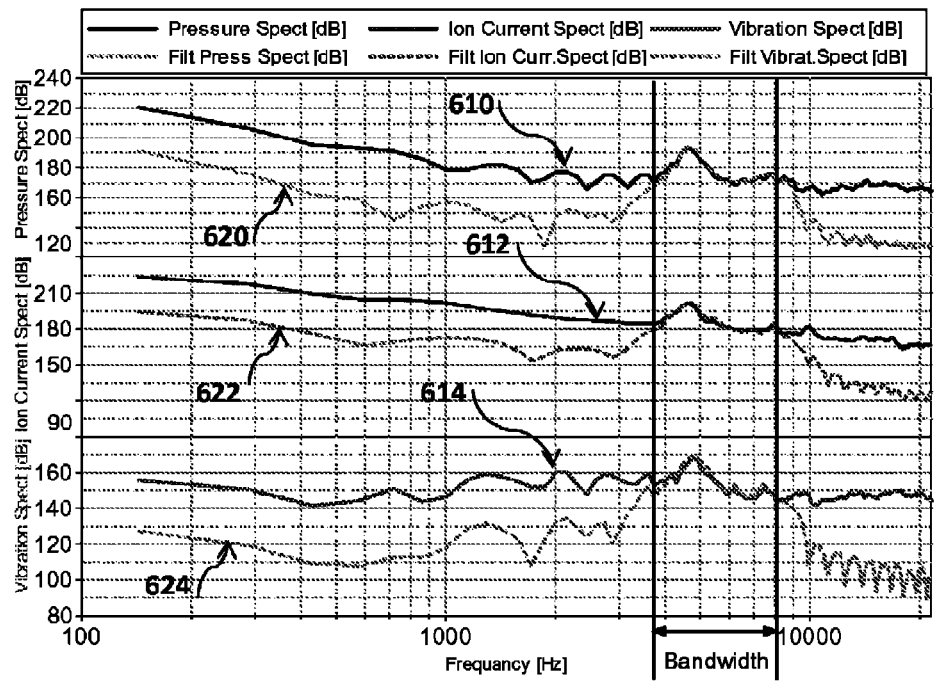
FIG. 6 is a graphical illustration of the frequency spectrum for the pressure, ion current, and vibration signals indicating the frequency bandwidth of the combustion resonance.

The pressure, ion current and vibration signals are processed using the FFT spectrum as shown in FIG. 6 to illustrate the pressure frequency spectrum 610, the ion current frequency spectrum 612, and the vibration frequency spectrum 614. The filtered pressure spectrum 620, the filtered ion current spectrum 622, and the filtered vibration spectrum 624, highlight the amplitude of the resonance of the first two vibration modes. The spectrum of the filtered pressure 620 shows eliminated frequency components of the raw pressure 610 except for the bandwidth of the combustion resonance. Similarly, the spectrum of the filtered ion current 622 shows eliminated frequency components of the raw ion current 612 except for the combustion resonance bandwidth. Also, the spectrum of the filtered vibration 624 shows eliminated frequency components of the raw vibration 614 except for the bandwidth of the combustion resonance.

Figure 7:
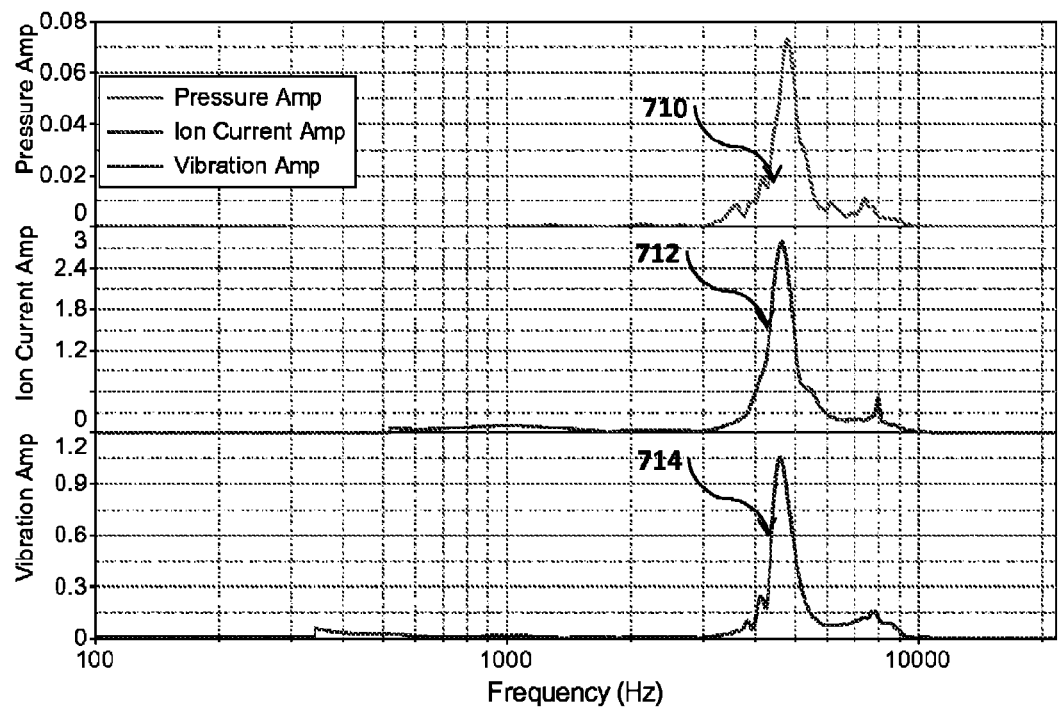
FIG. 7 is a graphical illustration of the power spectrum for the filtered pressure, ion current, and vibration signals.

FIG. 7 shows another interpretation for the intensity of combustion resonance of the first two vibration modes by showing the power spectra of the filtered pressure 610, ion current 612, and vibration 614.

Figure 8:
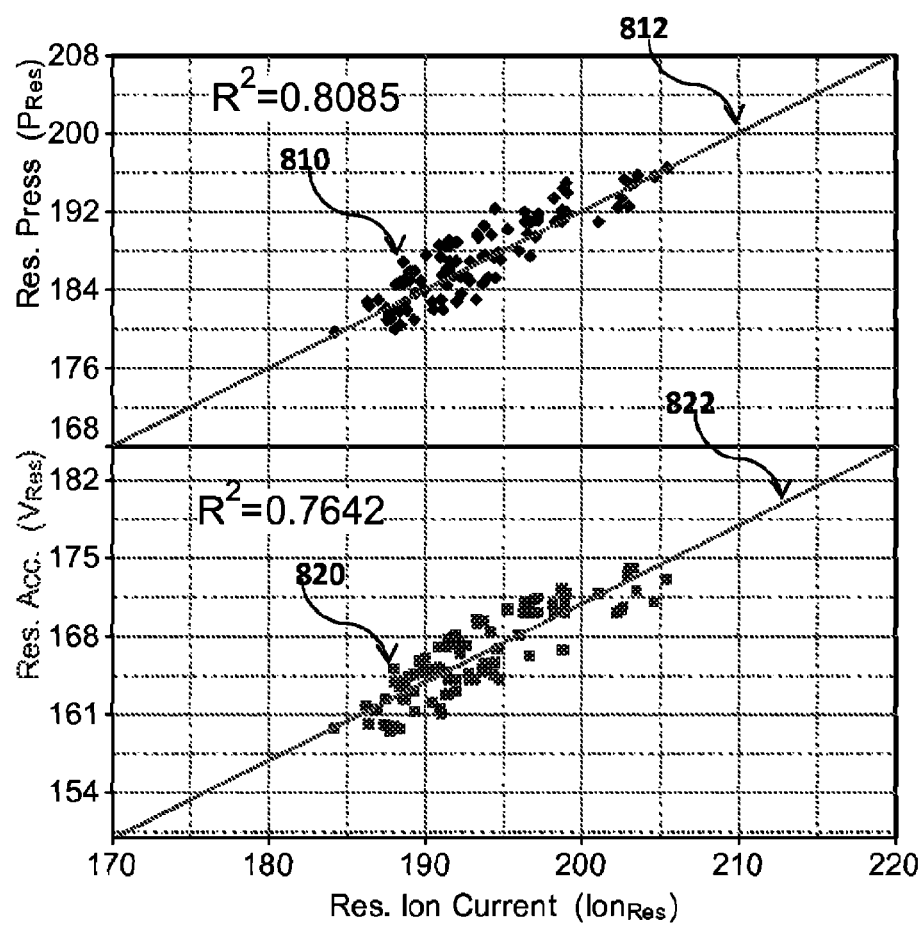
FIG. 8 is a graphical illustration of the pressure and vibration measured resonance compared to the ion current measured resonance.

FIG. 8 illustrates the combustion resonance calculated from the pressure signal $P_{res}$ and engine vibration signal $V_{res}$ plotted against the resonance from the ion current signal $Ion_{res}$ under various engine conditions. Data grouping 810 illustrates $P_{res}$ plotted relative to $Ion_{res}$ with a linear correlation of $R^2=0.8085$ represented by line 812. Data grouping 820 illustrates $V_{res}$ plotted relative to $Ion_{res}$ having a correlation of $R^2=0.7642$ represented by line 822.

Figure 9A:
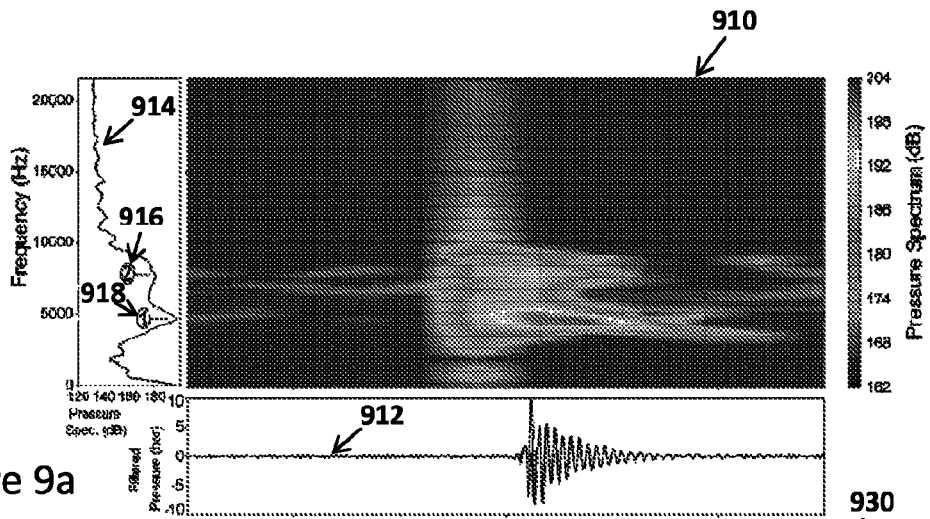
FIG. 9a-c are contour plots illustrating the amplitude of the combustion resonance measured by pressure, ion current, and vibration signals across the frequency spectrum at each CAD across the cycle.
Figure 9B:
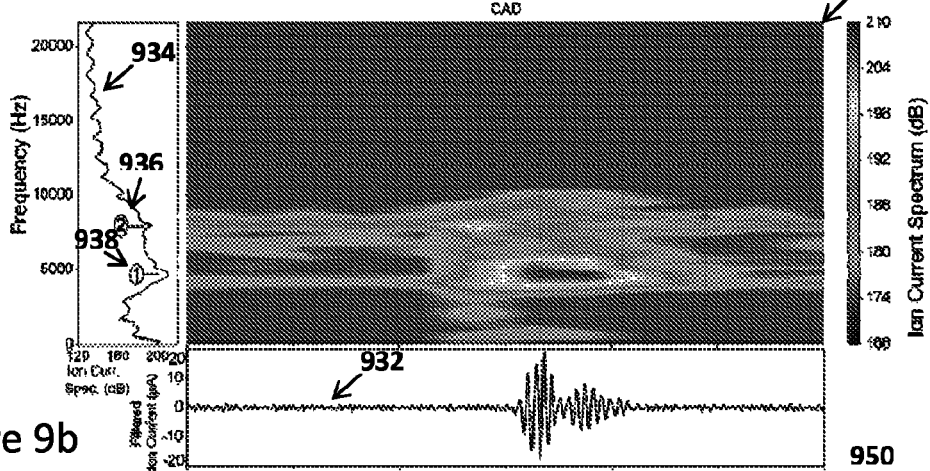
Figure 9C:
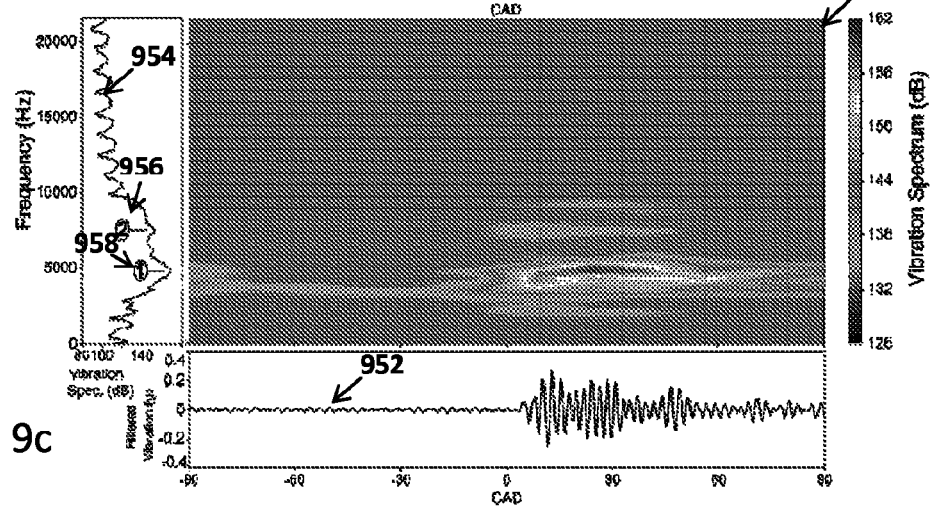

FIGS. 9a-c are contour plots applied to the filtered signal of the STFT to illustrate the amplitude of combustion resonance produced by the pressure, ion current, and vibration signals across the frequency spectrum at each CAD across the cycle. Specifically, FIG. 9a provides a contour plot of combustion resonance from the pressure 910 across the frequency spectrum during the cycle. As such, the x-axis represents CAD across the cycle. The y-axis represents the frequency spectrum and the brightness of the graph represents the contribution of different modes of combustion resonance. A profile 912 represents the filtered pressure signal in time domain and a profile 914 provides the FFT of the filtered pressure across the whole cycle in frequency domain. The pressure spectrum 914 indicates two peaks; the largest peak is denoted as the first mode by reference numeral 918 and the second mode is denoted by reference numeral 916. The contour plot indicates very high amplitude of combustion resonance just after start of combustion which is very intense until 34° CAD aTDC. The advantage of STFT shows details particularly for different vibration modes, where they exhibit different resonance durations and amplitudes during the expansion stroke.

Specifically, FIG. 9b provides a contour plot of combustion resonance from the ion current 930 across the frequency spectrum during the cycle. As such, the x-axis represents CAD across the cycle. The y-axis represents the frequency spectrum and the brightness of the graph represents the amplitude of combustion resonance produced by the ion current. A profile 932 represents the filtered ion current signal in time domain and a profile 934 provides the FFT of the filtered ion current across the whole cycle in frequency domain. The ion current spectrum 934 indicates two peaks, the largest peak is denoted as the first mode by reference numeral 938 and the second mode is denoted by reference numeral 936. Similar to the resonance from pressure contours shown in FIG. 9a, the contour plot in FIG. 9b indicates the intense amplitude of combustion resonance produced just after the start of combustion and contribution of different vibration modes in time-frequency domain.

Specifically, FIG. 9c provides a contour plot of combustion resonance from the vibration 950 across the frequency spectrum during the cycle. As such, the x-axis represents crank angle degrees across the cycle. The y-axis represents the frequency spectrum and the brightness of the graph represents the amplitude combustion resonance produced by the vibration signal. A profile 952 represents the filtered vibration signal in time domain and a profile 954 provides the FFT of the filtered ion current across the whole cycle in frequency domain. The vibration spectrum 954 indicates two peaks, the largest peak is denoted as the first mode by reference numeral 958 and the second mode is denoted by reference numeral 956. Similar to the resonance from pressure and ion current contours shown in FIGS. 9a-b, the contour plot in FIG. 9c indicates the intense amplitude of combustion resonance produced after the start of combustion and contribution of different vibration modes in time-frequency domain.

The characteristics, explained above are illustrated in FIGS. 9a-c, using the short-time Fourier transform (STFT). The advantage of using STFT over the conventional FFT is that it facilitates the interpretation of the resonant frequencies in a time domain. It permits processing the signal by decomposing it into short frames (windows) and computing the spectrum of each frame. A Gaussian window may be used for the computation with an overlap of 40%. In FIGS. 9a-c, the STFT plot combines the information for, the filtered waveform shown under each plot, and the FFT plot shown on the left side. Further, the STFT plots for the filtered signals of the ion current, cylinder pressure, and vibration show timings, phase shifts, amplitudes, and frequencies of the combustion resonance for the $1^{st}$ and $2^{nd}$ modes during a combustion cycle. Also, the STFT analysis shows that the ion current and pressure signals have more distinguished peaks for the first two resonance modes than the vibration signal. The red areas in FIGS. 9a-c represent severe combustion resonance detected by the three sensors, which continues for about 34° CAD.

Figure 10:
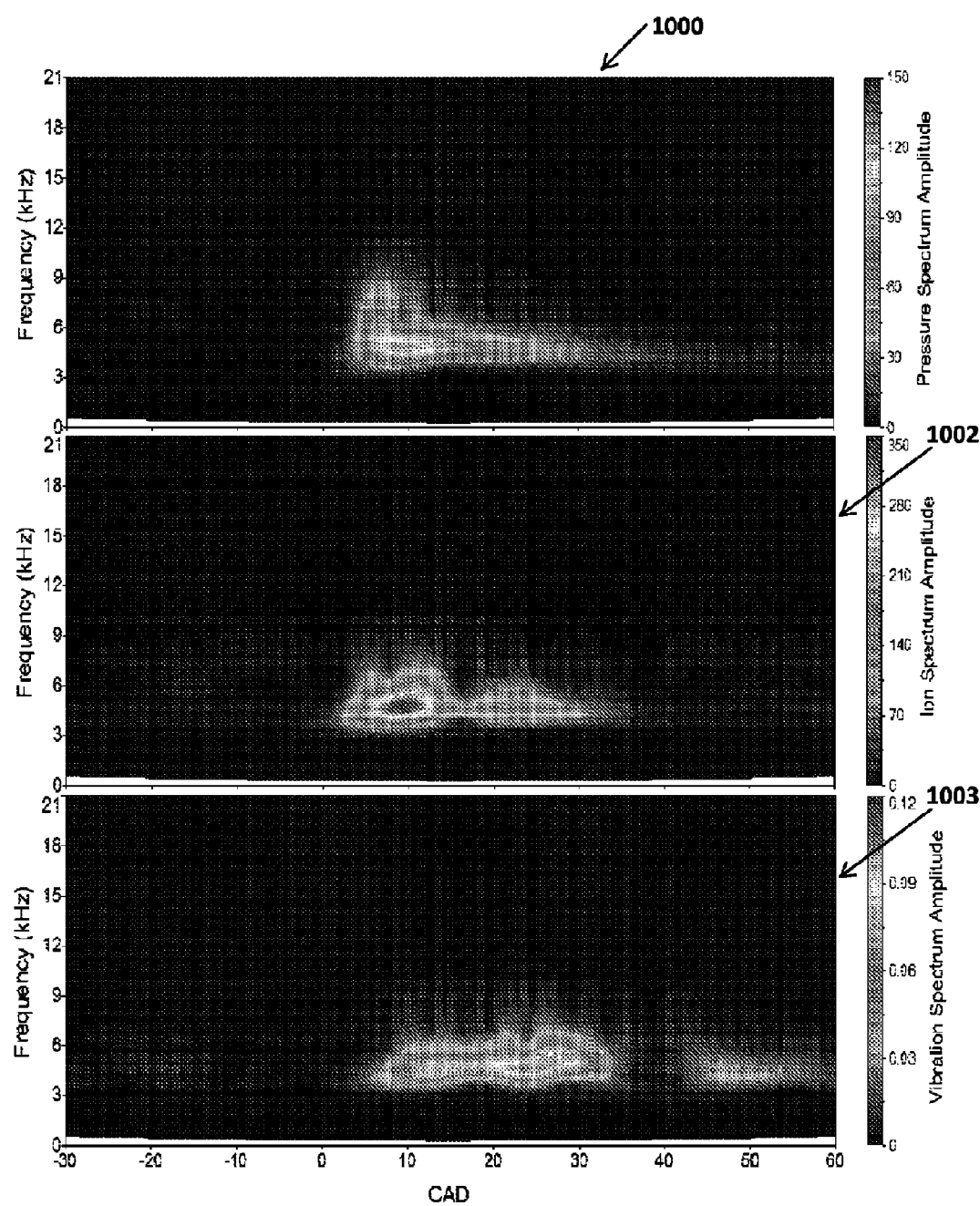
FIG. 10 are contour plots illustrating a continuous wavelet transform for combustion resonance in a single combustion event.

FIG. 10 shows contour plots representing continuous wavelet transform (CWT) for the filtered pressure, ion current and vibration signals. The x-axis represents CAD across the cycle. The y-axis represents the frequency spectrum and the brightness of the graph represents the amplitude of the combustion resonance. The contour plot of the combustion resonance from the filtered pressure signal is denoted by line 1000. The contour plot of the combustion resonance from the filtered ion current signal is denoted by line 1002. The contour plot of the combustion resonance from the filtered vibration signal is denoted by line 1003. STFT and CWT are 2-dimensional spectrums for time-frequency analysis but they are different in several aspects. The main difference is that CWT uses a size-adjustable window more advantageous than the fixed window used by STFT. Accordingly, CWT analysis applies higher time resolution at higher frequencies and lower time resolution at lower frequencies. This is not the case for the STFT, where the frequency resolution is the same over all frequencies. Another advantage is that CWT can extract the coefficients at a certain frequency of interest while STFT is not capable. Both CWT and STFT may be used to determine the time resolved combustion resonance produced during engine cycle.

Figures 11A, 11B:
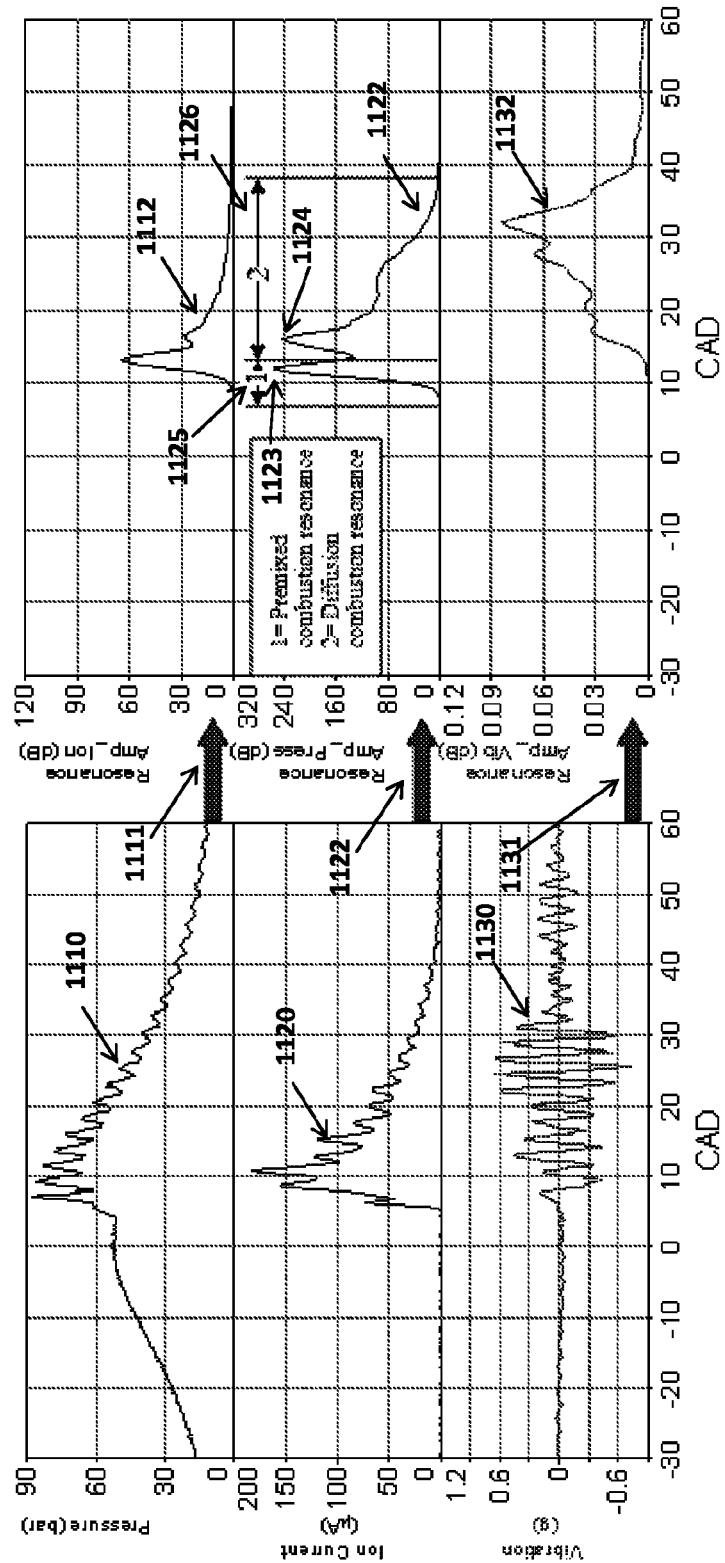
FIG. 11 are graphs showing the time-resolved continuous wavelet transform for combustion resonance in a single combustion event.

Referring to FIGS. 11a-b, the time resolved combustion resonance is extracted from the pressure, ion current, and vibration signals as shown for a single combustion event. FIG. 11a is a graph illustration of the cylinder gas pressure 1110, ion current 1120, and vibration 1130 signals of one combustion event in a cycle. The time resolved combustion resonance is computed from raw signals as indicated by lines 1111, 1122, 1131 as follows (i) apply a band pass filter for the range of the first two vibration modes, (ii) apply CWT or STFT analysis to the filtered signal, and (iii) conveying the amplitude of the combustion resonance in time. Therefore, the time resolved combustion resonance is calculated according to the pressure signal as denoted by line 1112, the ion current signal as denoted by line 1122, and the vibration signal as denoted by line 1132 as shown in FIG. 11b. For each of the resonance calculations shown, the CWT algorithm is used, however it is understood that other algorithms may also be used including STFT, or others. The resonance calculated according to the ion current signal in line 1122 illustrates two very distinct peaks denoted by reference numerals 1123 and 1124. It has been discovered from these peaks that a first portion of the combustion resonance calculated according to the ion current signal corresponds to the contribution of resonance during the pre-mixed combustion 1125. While the second portion 1126 is the resonance contribution from the diffusion and mixing control combustion. However, it can be seen that similar modes or correlations to the pre-mixed and diffusion contributions cannot be easily identified within the combustion resonance calculated from the pressure signal 1112 or the combustion resonance calculated from the vibration signal 1132.

Figures 12A, 12B:
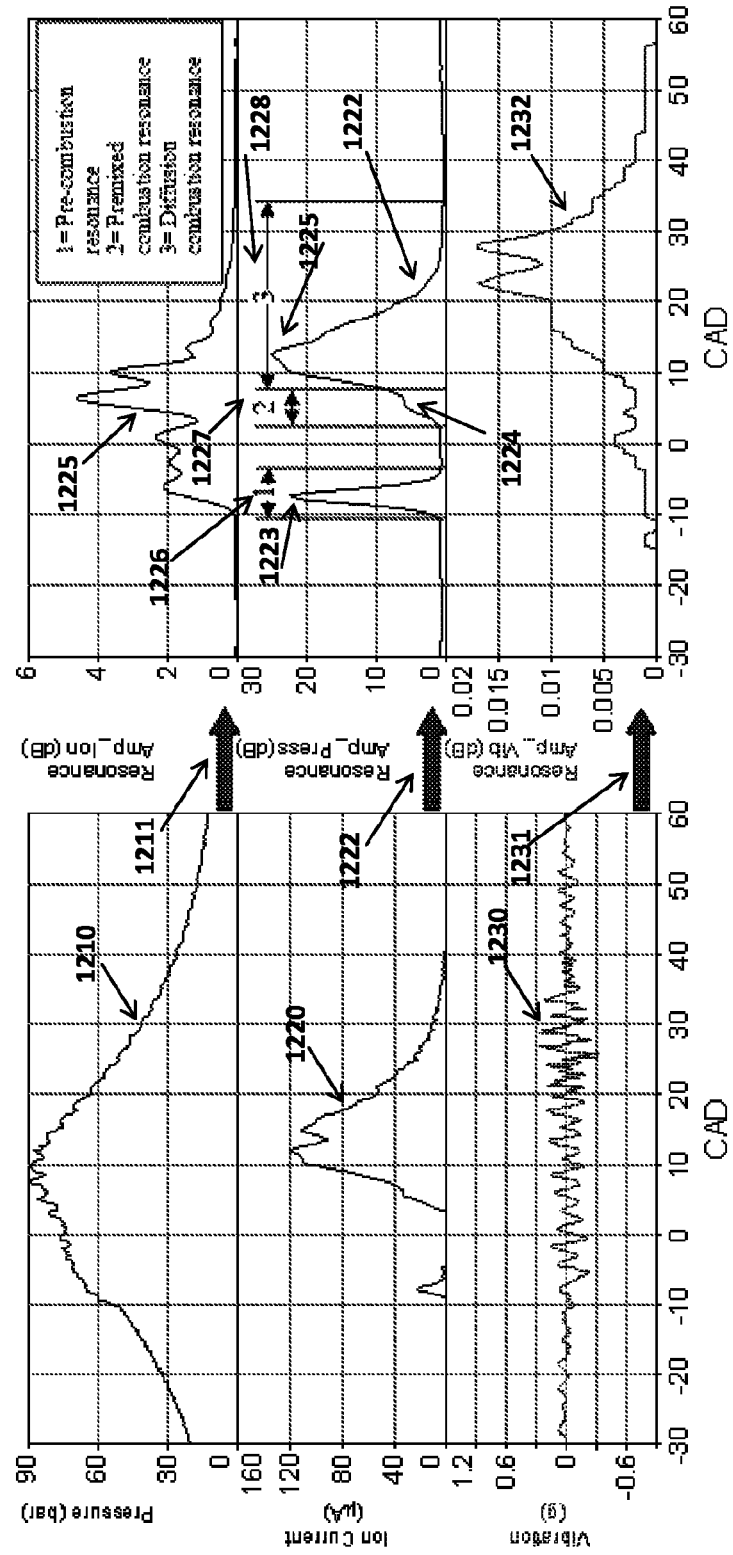
FIG. 12 are graphs showing the time-resolved continuous wavelet transform for combustion resonance in a multiple combustion events.

Now referring to FIGS. 12a-b, the time resolved combustion resonance is extracted from the pressure, ion current, and vibration signals as shown for a multi-injection event. FIG. 12a is a graph illustration of the cylinder gas pressure 1210, ion current 1220, and vibration 1230 signals of multi-injection event in a cycle. The time resolved combustion resonance is computed from raw signals as indicated by lines 1211, 1222, 1231 as explained earlier in FIG. 11. The time resolved combustion resonance in FIG. 12b is calculated according to the CWT algorithm based on the pressure signal as denoted by line 1225, based on the ion current signal as denoted by line 1222, and based on the vibration signal as denoted by line 1232. Again, in FIG. 12, the combustion resonance signal calculated from the ion current signal provides additional information which may be difficult to extract from the pressure 1225 and vibration 1232 signals. The combustion resonance calculated according to the ion current signal 1222 includes three phases, a first peak 1223, a small hump 1224, and a second peak 1225. Accordingly, the first portion of the signal 1226, including peak 1223, corresponds to the resonance produced from combustion of the pilot injection. Further, the premixed of the main combustion produced low resonance 1227 including hump 1224, and the third portion 1228, including peak 1225, corresponds to the combustion resonance contribution during the diffusion and mixing control combustion of the engine cycle. As such, the controller may adjust engine parameters based on signal characteristics such as the magnitude of peaks, the number of peaks, the slope of the signal, peaks timing and duration, or similar characteristics and whether those characteristics fall within the various contribution sections denoted with respect to FIGS. 10 and 11.

Figure 13:
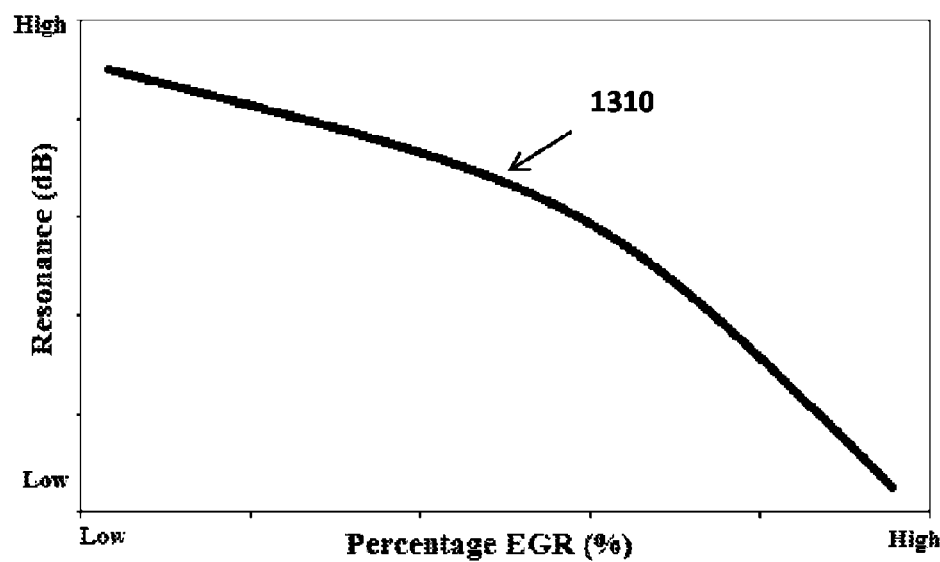
FIG. 13 is a graph illustrating the effect of exhaust gas recirculation (EGR) percentage on combustion resonance.

Now referring to FIG. 13, a graph is provided illustrating the relationship of combustion resonance to the percentage of EGR used by the engine. The relationship is generally denoted by line 1310. Generally, the lower the percentage of EGR, the higher the resonance. The higher the percentage of EGR, the amount of resonance is lower. Although the rate of the relationship may change across the spectrum as illustrated by line 1310.

Figure 14:
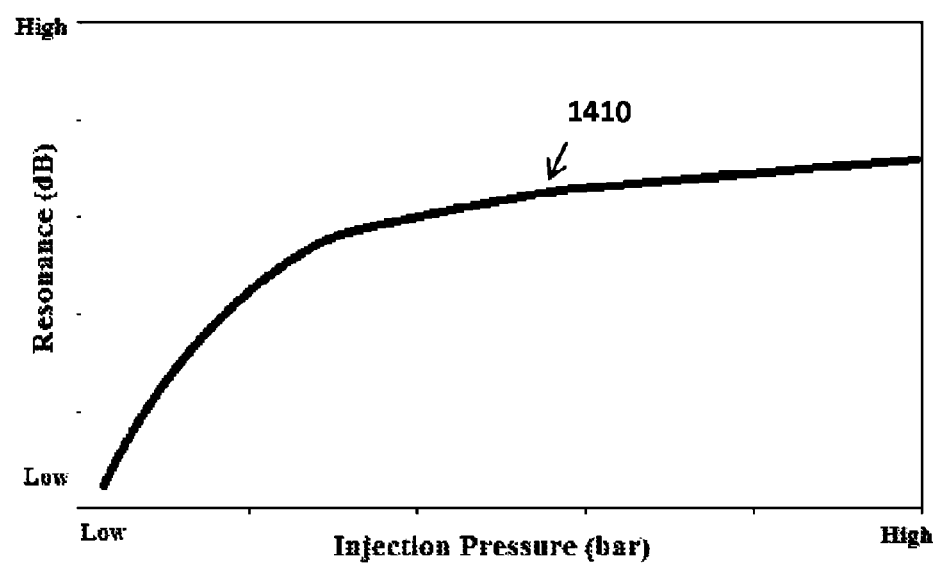
FIG. 14 is a graph illustrating the effect of injection pressure on combustion resonance.

Now referring to FIG. 14, the relationship of injection pressure to combustion resonance is denoted by line 1410. Generally, the lower the injection pressure, the lower the combustion resonance. However, as the injection pressure increases, the rate of increase in the resonance becomes smaller.

Figure 15:
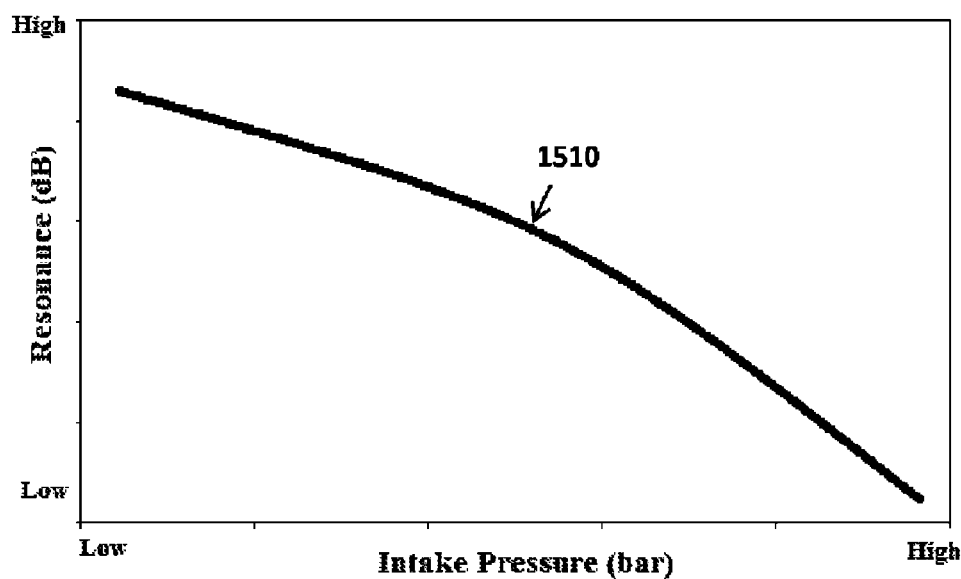
FIG. 15 is a graph illustrating the effect of intake pressure on combustion resonance.

Now referring to FIG. 15, the relationship between the intake pressure and the combustion resonance is denoted by line 1510. Generally, the lower the intake pressure, the higher the combustion resonance. Further, as the intake pressure increases, the combustion resonance decreases. In addition, the rate of change between the intake pressure and resonance may vary across the spectrum as illustrated by line 1510.

Figure 16:
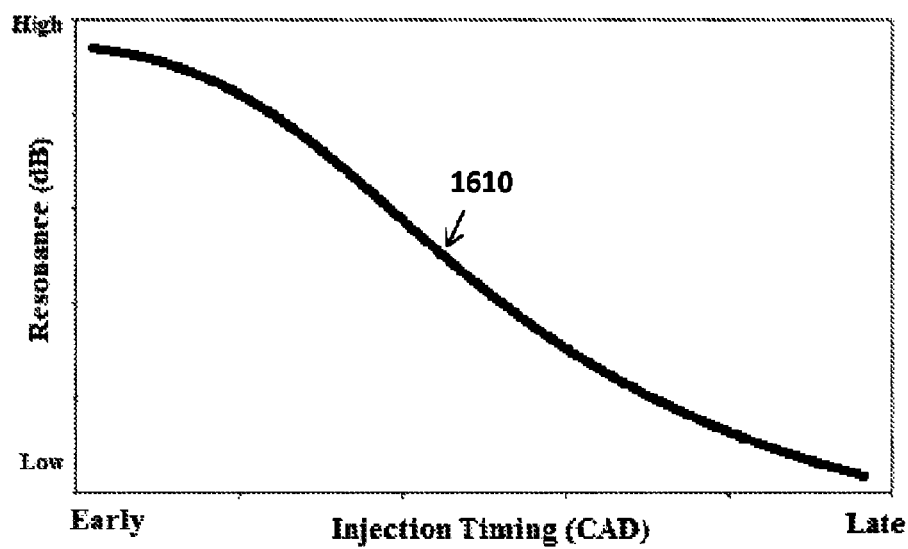
FIG. 16 is a graph illustrating the effect of injection timing on combustion resonance.

Now referring to FIG. 16, the relationship between the injection timing and the combustion resonance is denoted by line 1610. Generally, the early the injection timing, the higher the combustion resonance. Further, as the injection timing retards, the combustion resonance decreases. In addition, the rate of change between the injection timing and resonance may vary across the spectrum as illustrated by line 1610.

FIGS. 13-16 are plots to illustrate the effect of different engine parameters such as EGR, injection pressure, injection timing, and intake pressure on combustion resonance. Those parameters and other engine parameters may be used to maintain the combustion resonance at desired levels under conditions that satisfy emissions standards and production requirements.

Figures 17A, 17B:
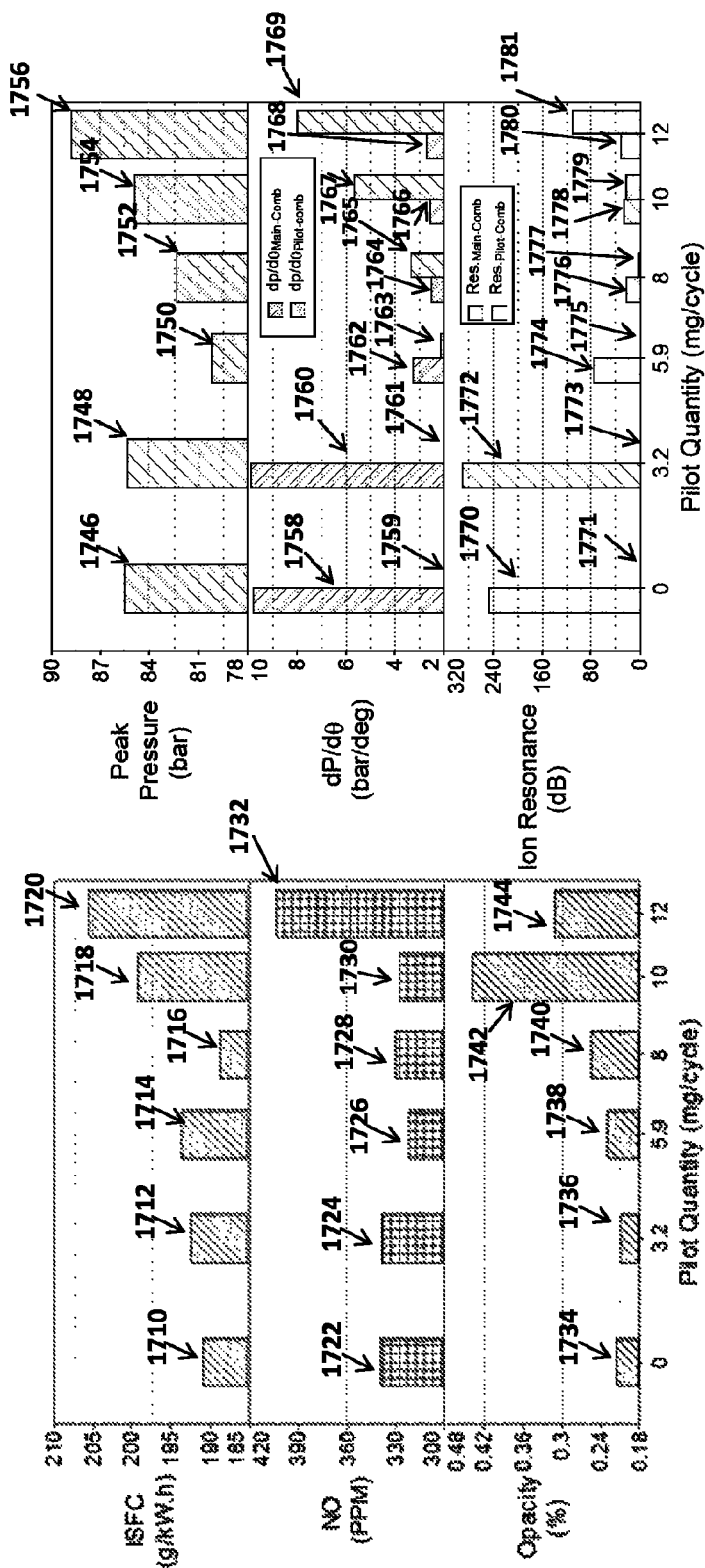
FIG. 17 are bar graphs illustrating the effect of pilot quantity on various engine parameters.

Now referring to FIGS. 17a-b, bar graphs are provided illustrating various engine parameters and the effect of pilot injection quantity on each of the parameters. In FIG. 17a, bars 1710, 1712, 1714, 1716, 1718, and 1720 illustrate the indicated specific fuel consumption (ISFC) for pilot injection quantity amounts of 0, 3.2, 5.9, 8.0, 10, and 12 milligrams per cycle, respectively. Bars 1722, 1724, 1726, 1728, 1730, and 1732 represent the Nitric oxide concentration (NO) in parts per million for pilot injection quantities 0, 3.2, 5.9, 8.0, 10, and 12 milligrams per cycle, respectively. Further, the opacity percentage is denoted by bars 1734, 1736, 1738, 1740, 1742, and 1744 for each pilot injection quantity of 0, 3.2, 5.9, 8.0, 10, and 12 milligrams per cycle, respectively.

In FIG. 17b, the peak pressure is denoted by bars 1746, 1748, 1750, 1752, 1754, and 1756 for pilot injection quantity amounts 0, 3.2, 5.9, 8.0, 10, and 12 milligrams per cycle. The maximum rate of pressure rise per CAD for the main injection is denoted by bars 1758, 1760, 1762, 1764, 1766, and 1768 for pilot injection quantities of 0, 3.2, 5.9, 8.0, 10, and 12 milligrams per cycle respectively. The maximum rate of pressure rise per CAD for the combustion of the pilot injection is denoted by bars 1759, 1761, 1763, 1765, 1767, and 1769 for pilot injection quantities of 0, 3.2, 5.9, 8.0, 10, and 12 respectively. In addition, the combustion resonance for the main combustion and the pilot combustion are also illustrated. The combustion resonance for the main combustion is denoted by bars 1770, 1772, 1774, 1776, 1778, and 1780 for pilot injection quantities of 0, 3.2, 5.9, 8.0, 10, and 12 respectively. The resonance from the combustion of the pilot injection is denoted by bars 1771, 1773, 1775, 1777, 1779, and 1781 for the pilot injection quantities of 0, 3.2, 5.9, 8.0, 10, and 12 respectively.

The parameters illustrated in FIGS. 17a-b were attained using ULSD fuel running at engine speed of 1800 rpm with location of the premixed combustion (LPPC) fixed at 4° aTDC. The injection pressure was set at 1200 bar with start of pilot injection (SOPI) at 25° before top dead center (bTDC), and an indicated mean effective pressure (IMEP) of 6 bar. In case of the single injection at pilot quantity of 0 mg/cycle, the combustion produces a high peak pressure of 85.4 bar and ISFC 190.8 g/kW·h, NO 340 ppm, and soot 0.22% A). By introducing the pilot injection and increasing its quantity from 3.2 to 5.9 mg/cycle, the combustion resonance significantly decreased which is also observed by the rate of pressure rise and peak cylinder pressure. At pilot injection quantity of 8 mg/cycle, the combustion resonance reaches its minimum value of 21.8 dB, where the fuel consumption is the lowest with ISFC of 188.8 g/kW·h. Further increase in the pilot injection quantity (i.e. more than 8 mg/cycle), a continuous increase in the combustion resonance is observed due to combustion from pilot injection which is reflected by the maximum rate of pressure rise, and peak cylinder pressure. This results in increasing NO and soot emissions, and the ISFC. FIG. 16 demonstrates an example for using pilot injection to reduce combustion resonance and arriving at reasonable trade-off between engine parameters such as ISFC, NO, and soot.

Figure 18:
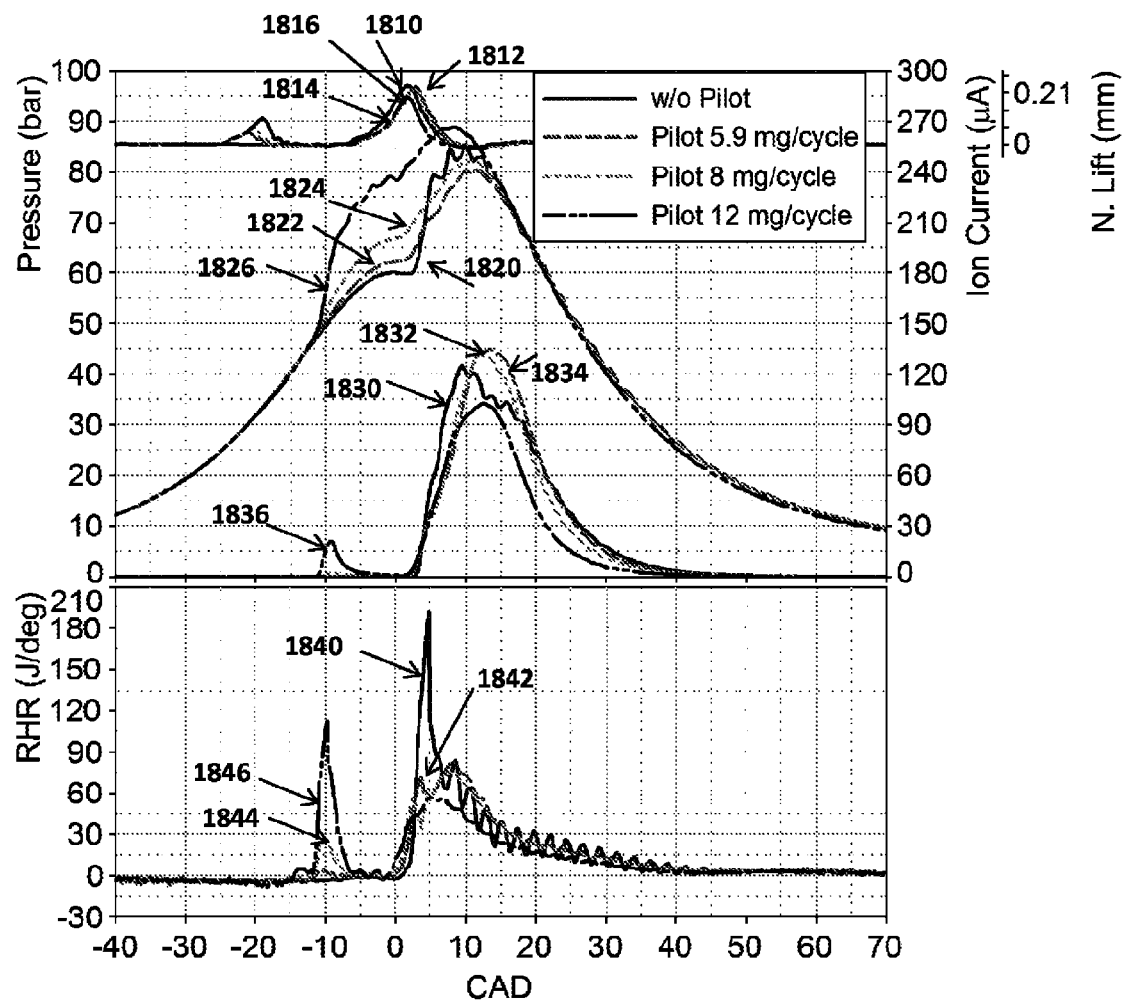
FIG. 18 is a graph illustrating the effect of different quantities of pilot injection on pressure, ion current, and RHR.

Now referring to FIG. 18, the pressure, ion current, needle lift, and RHR signals are illustrated through an engine cycle for various pilot injection quantities. Lines 1810, 1812, 1814, and 1816 are needle lift signals through an engine cycle for pilot injection quantities of 0, 5.9, 8.0, and 12 milligrams per cycle, respectively. Lines 1820, 1822, 1824, and 1826 are pressure signals through a combustion cycle for pilot injection quantities of 0, 5.9, 8.0, and 12 milligrams per cycle, respectively. Further, lines 1830, 1832, 1834, and 1836 are ion current signals through an engine cycle for pilot injection quantities of 0, 5.9, 8.0, and 12 milligrams per cycle, respectively. Lines 1840, 1842, 1844, and 1846 are rate of heat release (RHR) signals through an engine cycle for pilot injection quantities of 0, 5.9, 8.0, and 12 milligrams per cycle, respectively. FIG. 18 gives an explanation for the progress of the combustion process under different quantities of pilot injection reflected by results shown in FIG. 16. The single injection has the longest ID and produces the highest premixed combustion fraction in the RHR. At pilot injection of 5.9 mg/cycle, a slight increase in the cylinder gas pressure near TDC is noticed and a small peak in the RHR is developed. The heat release due to the pilot injection enhances the pressure and temperature conditions inside the cylinder. As a result, ID is shortened, and a sharp drop in the peak of the premixed combustion is followed by an increase in the diffusion mixing controlled combustion. This resulted in lowering the rate of pressure rise, peak cylinder pressure and NO emission. Further increase of pilot injection develops higher heat release during compression stroke from the pilot injection that produces higher cylinder pressure. The maximum rate of pressure rise after 8 mg/cycle is developed from the fuel burning due to the pilot injection which is followed by a slow burning after the main injection. The formation of soot is mainly controlled by the fuel evaporation and the presence of fuel spray in the flame. At higher quantity of pilot injection, the soot percentage increases mainly because of the presence of the fuel spray during combustion till a pilot quantity of 10 mg/cycle. Thereafter the soot drops at pilot quantity of 12 mg/cycle as a result of less amount of fuel being introduced at the main injection. It is also noticed that the increase in the heat release before TDC at higher quantities of pilot injection as shown in FIG. 18 is responsible for the significant increase in the ISFC as part of the work is done in the compression stroke bTDC. This is an example of the use of the ion current signal to detect and control combustion resonance and arrive at the reasonable trade-off between different engine operating parameters.

Figure 19:
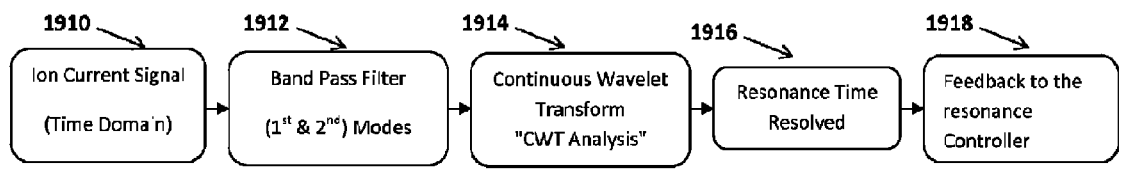
FIG. 19 is a flow chart of an algorithm illustrating ion current signal analysis using a continuous wavelet transform to produce a feedback signal to the engine ECU.

Now referring to FIG. 19, a flow chart illustrating signal analysis using a continuous wavelet transform algorithm is provided. The ion current signal is acquired in block 1910. In block 1912, a band pass filter is applied to the ion current signal. The band pass filter may be configured to allow passage of the first and second vibration modes of the ion current signal while repressing other portions of the signal. In block 1914, a CWT may be applied to the filtered ion current signal. The resonance time may then be resolved as denoted by block 1916. In block 1918, feedback may be provided to the resonance controller to adjust engine parameters.

Figure 20:
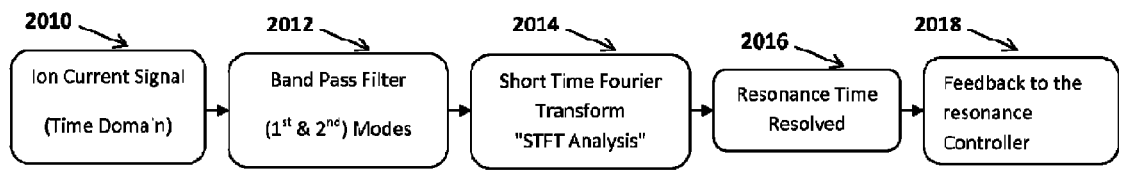
FIG. 20 is a flow chart of an algorithm illustrating ion current signal analysis using a STFT to produce a feedback signal to the engine ECU.

Now referring to FIG. 20, a flow chart illustrating signal analysis using a STFT algorithm is provided. The ion current signal is acquired in block 2010. In block 2012, a band pass filter is applied to the ion current signal. The band pass filter may be configured to allow passage of the first and second vibration modes of the ion current signal while repressing other portions of the signal. In block 2014, a STFT may be applied to the filtered ion current signal. The time resolved resonance may then be computed as denoted by block 2016. In block 2018, feedback may be provided to the resonance controller to adjust engine parameters.

Figure 21:
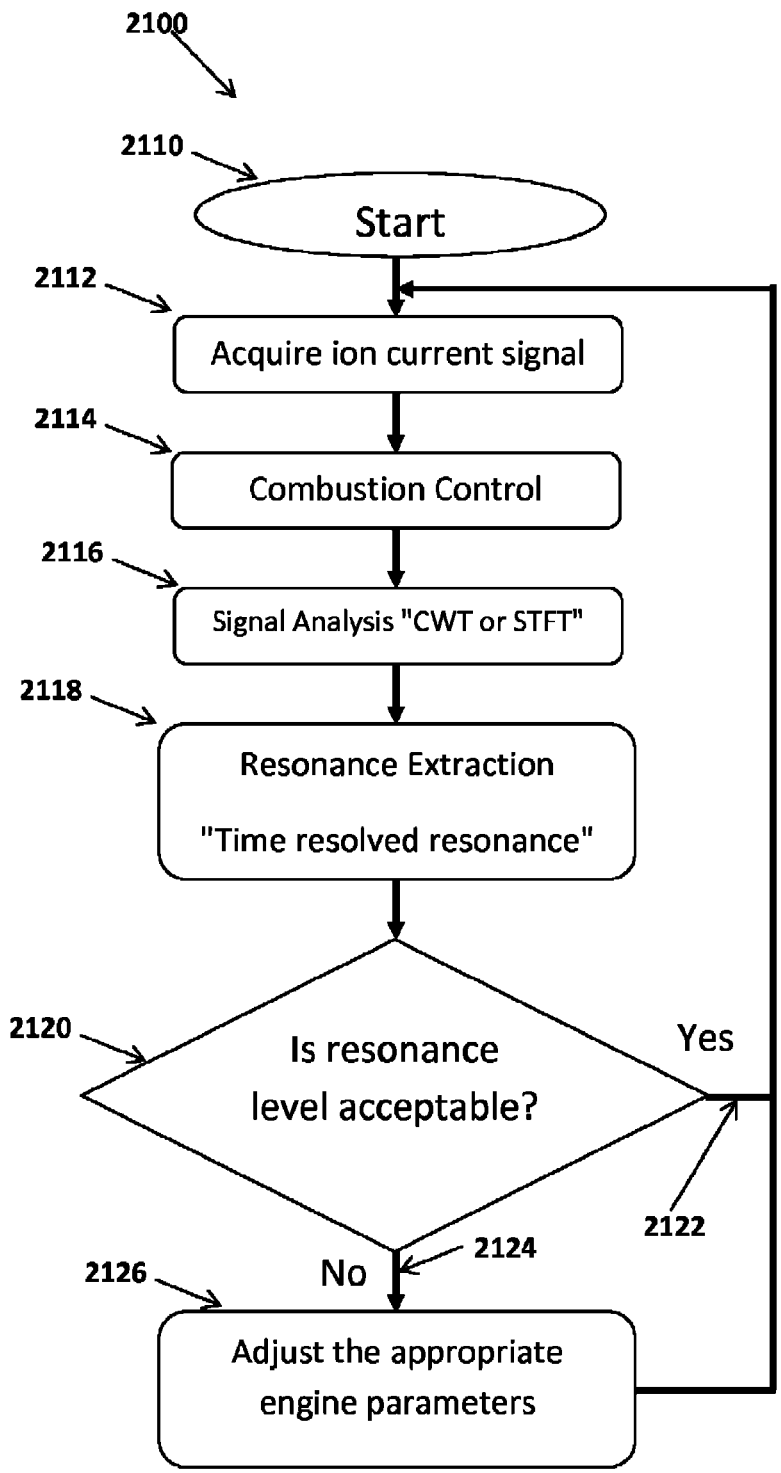
FIG. 21 is a flow chart illustrating an algorithm for controlling combustion resonance based on the feedback of the ion current signal to engine ECU.

Now referring to FIG. 21, a flow chart is provided for adjusting engine parameters based on the feedback from the combustion resonance calculated from the ion current signal. The method 2100 starts in block 2110. In block 2112, the ion current signal is acquired. In block 2114, the combustion process may be controlled by a close loop controller that uses the feedback of the ion current signal. The combustion controller may also include adjusting different engine parameters such as air delivery system and fuel delivery system in order to meet emissions standards and production targets in power and fuel economy. In block 2116, signal analysis is provided. The signal analysis may comprise filtering, for example, using a band pass filter and a frequency transformation for example, a continuous wavelet transform or a STFT. In block 2118, the resonance signal characteristics are extracted and time resolved combustion resonance is determined. In block 2120, various resonance signal characteristics may be compared to a limit or a threshold.

In some implementations, multiple characteristics of the combustion resonance signal may be compared to a separate threshold and the acceptability of the resonance may be based on a logical comparison of each of the thresholds. For example, if all of the thresholds are met or alternatively, if one group of the thresholds are met or another group of the thresholds are met, the resonance may be determined to be acceptable. Alternatively, a resonance acceptability score may be calculated according to a wavelet function of each of the parameters of the combustion resonance signal. Further, various combinations of thresholds and scores may be used in conjunction to determine if the resonance level is at an acceptable level. If the system determines that the resonance level is at an acceptable level based on the combustion resonance characteristics as calculated from the ion current signal, the method follows line 2122 to block 2112 where the method continues. If the combustion resonance is not at an acceptable level based on the combustion resonance characteristics calculated according to the ion current signal, the method follows line 2124 to block 2126. In block 2126, the controller may adjust the appropriate engine parameters based on the combustion resonance characteristics. The method may then proceed to block 2112 where the method continues.

Figure 22:
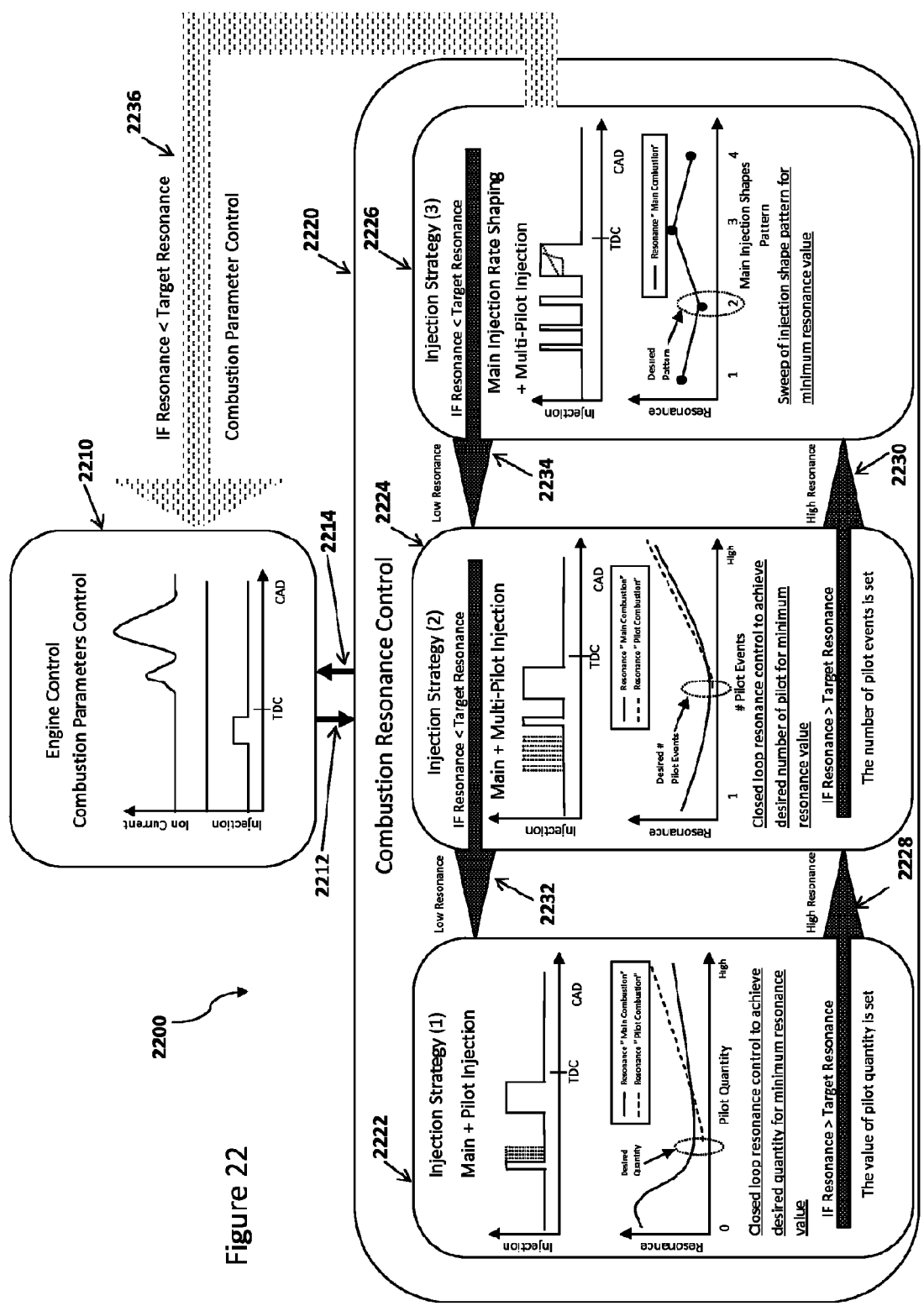
FIG. 22 is a schematic illustrating the selection of an injection strategy for resonance control based on the feedback from the ion current resonance.

Now referring to FIG. 22, a method 2200 for selecting an engine control strategy by using multiple injection events is provided. Block 2210 represents a block within the controller for controlling combustion parameters of a cylinder in an engine based on the feedback of the ion current signal. Block 2220 represents logic for selecting a combustion resonance control strategy. Various engine parameters may be used by block 2110 or block 2220 to control the combustion parameters and combustion resonance, where a continuous communication as denoted by arrow 2212 and 2214 between block 2210 and 2220 based on priorities set to meet production targets in power, fuel economy, gaseous emissions, and noise and vibration emissions. In another embodiment, the combustion resonance controller block 2220 may operate dependently or independently from the combustion controller block 2210 or other control block in the ECU. In the combustion resonance control block 2220, multiple injection strategies 2222, 2224, and 2226 may be implemented inside the engine control unit based on a series of thresholds. For example, if the level of the combustion resonance is higher than a first threshold, an injection strategy (1) denoted by block 2222 is activated. The injection strategy (1) in block 2222 consists of introducing an incremental amount of pilot injection, where the resonance during the main combustion reduces. The sweet spot for the amount of pilot injection may be achieved by reaching a minimum resonance level due to the main combustion with avoiding combustion resonance due to pilot injection as shown in graph in block 2222. This sweet spot of the pilot quantity is controlled by a closed loop combustion resonance controller. It should be noted that the timing between the pilot injection and the main injection may be adjusted based on the combustion controller in block 2110. In case the resonance level is still higher than the first threshold, the strategy follow line 2228 to injection strategy (2) denoted by block 2224.

In the injection strategy (2) of block 2224, the pilot quantity may be split into multiple pilot injection events incrementally and in a closed loop in order to achieve the minimum resonance. In addition, the quantity of each pilot injection may be varied appropriately. If the combustion resonance is lowered, the controller follows line 2232 back to injection strategy (1). Otherwise, acceptable resonance level will keep injection strategy (2) active. Further, if the resonance level are still not met by injection strategy (2), the controller will follow line 2230 to injection strategy (3) denoted by block 2226. The injection strategy (3) in block 2226 may use the injection settings achieved by injection strategy (1) and (2) for the pilot injection, where it operates a sweep of injection rate shape patterns or profiles to achieve the desired resonance levels. If the combustion resonance is lower than the third threshold, the controller follows line 2234 back to injection strategy (2). Otherwise, acceptable resonance level will keep injection strategy (3) active. It should be noted that the three injection strategies in blocks 2222, 2224 and 2226, and other injection strategies may be used in separately or in series as explained to control the combustion resonance. Also, the order of the strategies to be applied during engine operation can change based on the production targets. In some conditions where the combustion resonance is still higher than the third threshold, the controller may follow line 2236, to the combustion parameters controller 2210 to adjust main combustion parameters to reduce combustion resonance.

Figure 23:
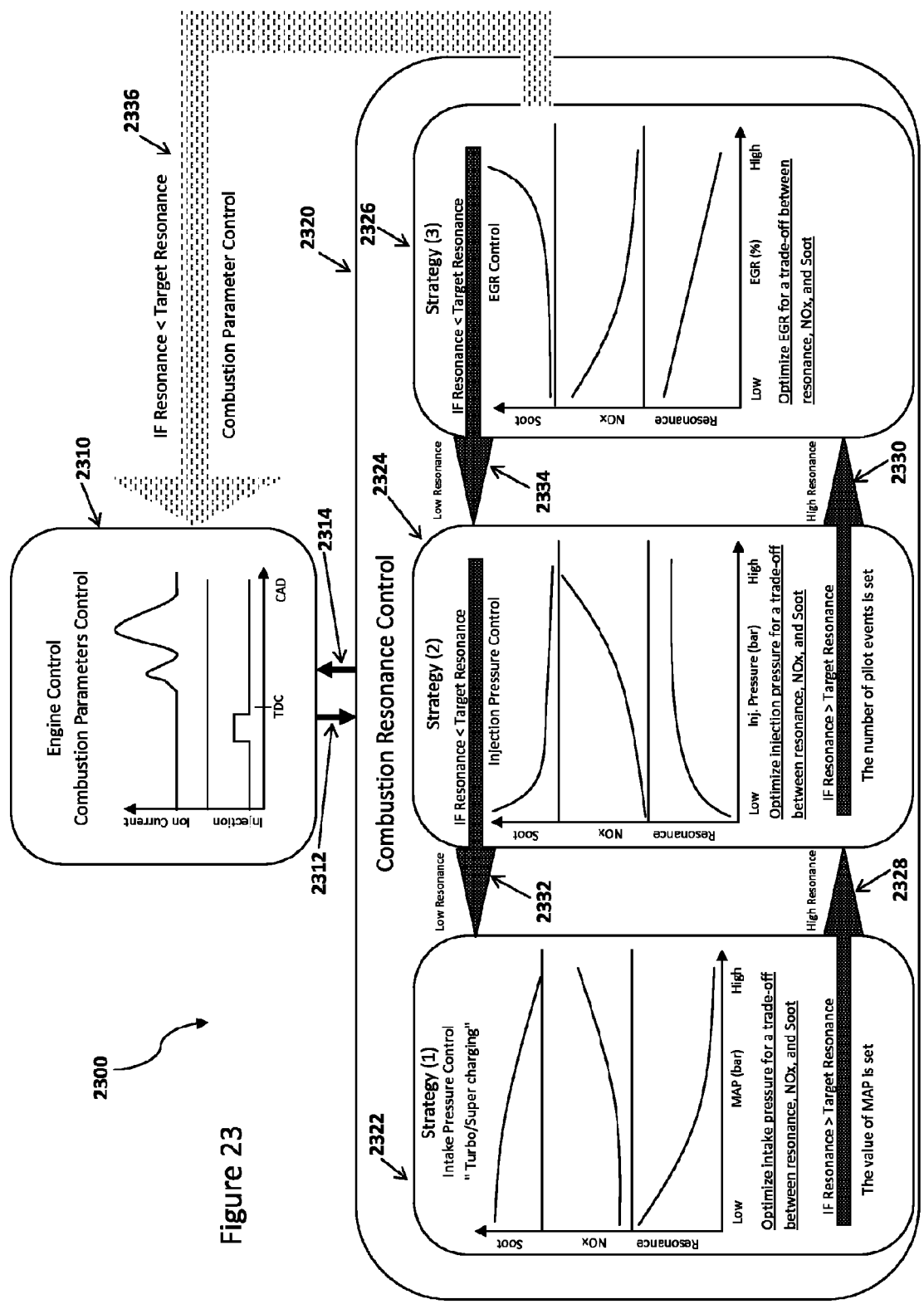
FIG. 23 is a schematic illustrating the selection of engine operating parameters for resonance control based on the feedback from the ion current resonance.

Now referring to FIG. 23, a sample strategy 2300 to control combustion resonance by using combinations of fuel and air system parameters is provided. On the engine control block such as a combustion controller may be implemented as denoted by block 2210. Further, a combustion resonance controller block may also be implemented, as denoted by block 2320. Various engine parameters may be used by block 2310 or block 2320 to control the combustion parameters and combustion resonance, where a continuous communication as denoted by arrow 2312 and 2314 between block 2310 and 2320 based on priorities set to meet production targets in power, fuel economy, gaseous emissions, and noise and vibration emissions. In another embodiment, the combustion resonance control block 2320 may operate dependently or independently from the combustion controller in block 2310 or other control block in the ECU.

The combustion resonance control block 2320 may include a plurality of resonance control strategies 2322, 2324, and 2326 that may be implemented based on a plurality of thresholds. If the combustion resonance level is higher than a first threshold, the first resonance control strategy 2322 may be implemented which is based on the intake manifold pressure (MAP). In the first resonance control strategy of block 2322, the intake pressure may be controlled by adjusting a turbocharger or supercharger. Accordingly, the intake pressure may be optimized to provide a tradeoff between resonance, NOx, and soot. As such, the MAP value may be set based on the resonance, NOx and soot values that are measured from the engine and the priorities tradeoff set during production. If the resonance is not reduced to the desired targets, the second strategy 2324 may be implemented, as denoted by arrow 2328.

In the second resonance control strategy 2324, the injection pressure is controlled based on the measured resonance, NOx, and soot values. As such, the system may be configured to optimize the injection pressure for tradeoff between resonance, NOx and soot. In this strategy, the quantity, timing and number of injection events may also be set. If the combustion resonance is not yet reduced to the desired targets, the third resonance strategy 2326 may be implemented as denoted by arrow 2330.

In the third resonance control strategy 2326, the EGR percentage is controlled based on the measured resonance, NOx, and soot. As such, the system is configured to optimize the EGR percentage for a tradeoff between resonance, NOx, and soot. If the combustion resonance again falls below the threshold, the second resonance strategy 2224 may be again implemented, as denoted by arrow 2334. It should be noted that the three resonance control strategies in blocks 2322, 2324 and 2326, and other engine strategies may be used in separately or in series as explained to control the combustion resonance. Also, the order of the strategies to be applied during engine operation can change based on the production targets. In some conditions where the combustion resonance is still higher than the third threshold, the controller may follows line 2336, to the combustion parameters controller 2310 to adjust main combustion parameters to reduce combustion resonance. Many of the control strategies explained earlier may affect other outputs including but not limited to the following: output power, fuel economy, exhaust emissions, noise, vibration and harshness. Therefore, tradeoffs may be used based on the production targets.

As a person skilled in the art will readily appreciate, the above description is meant as an illustration of implementation of the principles this application. This description is not intended to limit the scope of this application in that the system is susceptible to modification, variation and change, without departing from the spirit of this application, as defined in the following claims.

We claim:

1. A system for controlling an engine, the system comprising:
   an ion current sensor configured to sense ion current within one or each cylinder of a multi-cylinder engine; and
   a controller in communication with the ion current sensor to receive an ion current signal, the controller being configured to determine combustion resonance from frequency analysis of the ion current signal across a combustion cycle, the controller determining an engine control strategy based on the combustion resonance feedback, wherein the controller is configured to compare the combustion resonance to a first threshold, when the controller determines that the resonance is above the first threshold the controller is configured to adjust injection parameters.

2. The system according to claim 1, wherein the controller determines the combustion resonance based on frequency analysis of the ion current signal.

3. The system according to claim 2, wherein the controller is configured to filter the ion current signal.

4. A system for controlling an engine, the system comprising:
   an ion current sensor configured to sense ion current within one or each cylinder of a multi-cylinder engine; and
   a controller in communication with the ion current sensor to receive an ion current signal, the controller being configured to determine combustion resonance from frequency analysis of the ion current signal across a combustion cycle, the controller determining an engine control strategy based on the combustion resonance feedback, wherein the controller is configured to band pass filter the first and second vibration modes of the ion current signal.

5. The system according to claim 4, wherein the controller determines the combustion resonance based on a continuous wavelet transform of the ion current signal.

6. The system according to claim 4, wherein the controller determines the combustion resonance based on a short time Fourier transform of the ion current signal.

7. The system according to claim 1, wherein the controller is configured to control engine parameters based on the combustion resonance calculated from the ion current signal.

8. The system according to claim 1, wherein the controller is configured to control injection parameters based on the combustion resonance calculated from the ion current signal.

9. The system according to claim 8, wherein the controller is configured to control pilot quantity based on the combustion resonance calculated from the ion current signal.

10. The system according to claim 8, wherein the controller is configured to control pilot timing based on the combustion resonance calculated from the ion current signal.

11. The system according to claim 8, wherein the controller is configured to control number of injection events based on the combustion resonance calculated from the ion current signal.

12. The system according to claim 8, wherein the controller is configured to control a shape of injection rate profile based on the combustion resonance calculated from the ion current signal.

13. The system according to claim 1, wherein the controller is configured to control injection pressure based on the combustion resonance calculated from the ion current signal.

14. The system according to claim 1, wherein the controller is configured to control EGR based on the combustion resonance calculated from the ion current signal.

15. The system according to claim 1, wherein the controller is configured to control manifold absolute pressure based on the combustion resonance calculated from the ion current signal.

16. The system according to claim 4, wherein the controller is configured to compare the combustion resonance to a first threshold, when the controller determines that the resonance is above the first threshold the controller is configured to adjust quantity of pilot injection events, and when the controller determines that the combustion resonance is below the first threshold the controller is configured to adjust timing or quantity of a pilot injection event.

17. The system according to claim 1, wherein the controller is configured to compare the combustion resonance to a second threshold, when the controller determines the combustion resonance is above the second threshold the controller is configured to adjust a shape of injection rate profile of a main injection event.

18. The system according to claim 1, wherein the controller is configured to compare the combustion resonance to a first threshold, when the controller determines the combustion resonance is above the first threshold the controller is configured to adjust an intake pressure, and when the controller determines that the combustion resonance is below the first threshold the controller is configured to adjust an injection pressure.

19. A method for controlling an engine, the method comprising:
   sensing ion current, with at least one ion current sensor, within one or each cylinder of a multi-cylinder engine;
   determining combustion resonance according to frequency analysis of the ion current signal across a combustion cycle, and
   determining, with a controller, an engine control strategy based on the combustion resonance according to the ion current signal;
   wherein the determining comprises comparing the combustion resonance to a first threshold, when the controller determines the combustion resonance is above the first threshold the controller is configured to adjust an intake pressure, and when the controller determines that the combustion resonance is below the first threshold the controller is configured to adjust an injection pressure.

20. The system according to claim 19, wherein the controller is configured to compare the combustion resonance to a second threshold, when the controller determines above the second threshold the controller is configured to adjust a percentage of exhaust gas recirculation used by the engine.

* * * * *